(12) United States Patent
Shu et al.

(10) Patent No.: US 12,185,091 B2
(45) Date of Patent: Dec. 31, 2024

(54) COMMUNICATIONS SYSTEM SWITCHING METHOD AND TERMINAL DEVICE

(71) Applicant: Huawei Technologies Co., Ltd., Shenzhen (CN)

(72) Inventors: Haw-Wei Shu, Shanghai (CN); Chien-Jen Huang, Shanghai (CN); Hsingyu Lung, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 714 days.

(21) Appl. No.: 17/285,636

(22) PCT Filed: Oct. 26, 2018

(86) PCT No.: PCT/CN2018/112219
§ 371 (c)(1),
(2) Date: Sep. 8, 2021

(87) PCT Pub. No.: WO2020/082373
PCT Pub. Date: Apr. 30, 2020

(65) Prior Publication Data
US 2022/0232445 A1  Jul. 21, 2022

(51) Int. Cl.
*H04W 36/00* (2009.01)
*H04W 28/24* (2009.01)
*H04W 36/30* (2009.01)
*H04W 36/32* (2009.01)
*H04W 88/06* (2009.01)

(52) U.S. Cl.
CPC ....... *H04W 36/0085* (2018.08); *H04W 28/24* (2013.01); *H04W 36/0044* (2013.01); *H04W 36/322* (2023.05); *H04W 36/304* (2023.05); *H04W 88/06* (2013.01)

(58) Field of Classification Search
None
See application file for complete search history.

(56) References Cited

U.S. PATENT DOCUMENTS

| | | | |
|---|---|---|---|
| 7,684,800 | B2 | 3/2010 | Kuhn et al. |
| 9,924,401 | B2 | 3/2018 | Gupta |
| 2012/0184277 | A1 | 7/2012 | Hiltunen et al. |
| 2014/0112251 | A1 | 4/2014 | Kim et al. |

(Continued)

FOREIGN PATENT DOCUMENTS

| | | |
|---|---|---|
| CN | 105517082 A | 4/2016 |
| CN | 105848233 A | 8/2016 |

(Continued)

*Primary Examiner* — Hong Shao
(74) *Attorney, Agent, or Firm* — Conley Rose, P.C.

(57) ABSTRACT

A communications system switching method and a terminal device establish, by the terminal device, a connection to a first communications system, run a first application, obtain a QoS value of a second communications system, determine based on a preset policy and a QoS requirement of the first application, whether the QoS value of the second communications system meets the QOS requirement of the first application. When the QoS value of the second communications system meets the QOS requirement of the first application, the terminal device disconnects from the first communications system and establishes a connection to the second communications system.

20 Claims, 11 Drawing Sheets

(56) References Cited

U.S. PATENT DOCUMENTS

| | | | |
|---|---|---|---|
| 2015/0350953 A1* | 12/2015 | Himayat | H04W 40/02 |
| | | | 370/235 |
| 2016/0345230 A1 | 11/2016 | Cuevas Ramirez et al. | |
| 2016/0374053 A1 | 12/2016 | Hareuveni et al. | |
| 2017/0353865 A1* | 12/2017 | Li | H04W 36/14 |
| 2018/0343608 A1 | 11/2018 | Duan et al. | |

FOREIGN PATENT DOCUMENTS

| | | |
|---|---|---|
| CN | 105897810 A | 8/2016 |
| CN | 106413017 A | 2/2017 |
| CN | 108391298 A | 8/2018 |
| EP | 3358792 A1 | 8/2018 |
| IN | 101080089 A | 11/2007 |
| KR | 100734907 B1 | 7/2007 |
| WO | 2017063485 A1 | 4/2017 |

\* cited by examiner

COMMUNICATIONS SYSTEM SWITCHING METHOD AND TERMINAL DEVICE

CROSS-REFERENCE TO RELATED APPLICATIONS

This application is a U.S. National Stage of International Patent Application No. PCT/CN2018/112219 filed on Oct. 26, 2018, which is hereby incorporated by reference in its entirety.

TECHNICAL FIELD

This application relates to the field of terminal technologies, and in particular, to a communications system switching method and a terminal device.

BACKGROUND

With development of wireless communications technologies, more communications standards are widely applied to terminal devices. A terminal device that supports a plurality of communications standards is a terminal device having a plurality of wireless communications modules. Each wireless communications module of the terminal device may implement a data transmission function by sending and receiving a wireless signal, and the communications modules may use different communications standards. For example, the communications standard may be a cellular mobile communications technology such as GSM, CDMA, or LTE, or may be a wireless local area network communications technology such as Wi-Fi. In conclusion, the terminal device that supports a plurality of communications standards is capable of transmitting service data according to different communications standards.

In a real environment, there is a scenario in which a plurality of communications systems that support different communications standards coexist. Therefore, the terminal device needs to select one communications system from the plurality of communications systems, and establishes a connection to the communications system.

In the prior art, a process in which a terminal device selects a communications system is as follows:

Three communications systems are used as an example, and the communications systems support different communications standards. It is assumed that the terminal device is currently connected to an access point AP 1 in a communications system 1, and the terminal device may detect a QoS value of the AP 1. When determining that the QoS value of the currently connected AP 1 is less than a threshold, the terminal device disconnects from the AP 1, and connects to the AP 2, to detect a QoS value of the AP 2. If the QoS value of the AP 2 is greater than the threshold, the terminal device is connected to the AP 2 for a relatively long time.

It can be learned that in the prior art, in a process in which the terminal device switches a communications system, another communications system whose QoS value is greater than the threshold is searched for only when a QoS value of a currently connected communications system is less than the threshold. It can be learned that in the prior art, there is only a single communications system switching condition, and an intelligence requirement of a terminal device cannot be met.

SUMMARY

This application provides a communications system switching method and a terminal device, to resolve a prior-art technical problem that there is only a single switching condition for switching a communications system by the terminal device, and an intelligence requirement of a terminal device cannot be met.

According to a first aspect, an embodiment of this application provides a communications system switching method. The method may be performed by a terminal device (for example, a mobile phone or a tablet). The method includes: establishing, by a terminal device, a connection to a first communications system, and running, by the terminal device, a first application; obtaining, by the terminal device, a QoS value of a second communications system; determining, by the terminal device based on a preset policy and a QoS requirement of the first application, whether the QoS value of the second communications system meets the QoS requirement of the first application; and if the QoS value of the second communications system meets the QoS requirement of the first application, disconnecting, by the terminal device, from the first communications system, and establishing a connection to the second communications system.

In this embodiment of this application, the terminal device may choose, based on different applications, to connect to different communications systems, to meet a QoS requirement of each application. This solution is relatively flexible and has a relatively high intelligence degree.

In a possible design, before the determining, by the terminal device based on a preset policy and a QoS requirement of the first application, whether the QoS value of the second communications system meets the QoS requirement of the first application, the method further includes: determining, by the terminal device, that a preset condition is met, where the preset condition includes one or more of the following conditions: an OsS value of the first communications system does not meet a requirement of the first application; an OsS value of the first communications system does not meet a user requirement; and current power consumption of the terminal device is greater than preset power consumption.

In this embodiment of this application, the terminal device may determine whether a currently connected communications system meets a current service requirement or a user requirement, or have relatively high power consumption, to determine whether to switch to another communications system. In this manner, frequent switching between communications systems can be avoided, and power consumption can be reduced.

In a possible design, the QoS value of the second communications system is superior to the QoS value of the first communications system.

In this embodiment of this application, a QoS value of a to-be-switched-to communications system is superior to a QoS value of a currently connected communications system, so that after the terminal device switches a communications system, the terminal device can provide better experience, for example, a video is played more smoothly.

In a possible design, that the QoS value of the second communications system is superior to the QoS value of the first communications system includes: if the QoS includes a latency and/or a packet loss rate, the QoS value of the second communications system is less than the QoS value of the first communications system; or if the QoS includes a throughput, the QoS value of the second communications system is greater than the QoS value of the first communications system.

In this embodiment of this application, the QoS includes a latency, a packet loss rate, a throughput, and the like. Different applications have different requirements for the latency, the packet loss rate, and the throughput. For example, for an application that has a relatively high latency requirement, a latency of a to-be-switched-to communications system determined by the terminal device is less than a latency of a currently connected communications system. In this way, after the terminal device switches a communications system, the application can run more smoothly, to help provide better experience. For example, a video is played more smoothly.

In a possible design, before the disconnecting, by the terminal device, from the first communications system, the method further includes: outputting, by the terminal device, first prompt information, where the first prompt information is used to prompt a user whether to disconnect from the first communications system; and receiving, by the terminal device, an indication indicating that the user agrees to disconnect from the first communications system.

In this embodiment of this application, the terminal device may prompt the user whether to disconnect from the currently connected communications system, to provide a selection opportunity for the user, and improve user experience.

In a possible design, the determining, by the terminal device based on a preset policy and a QoS requirement of the first application, whether the QoS value of the second communications system meets the QoS requirement of the first application includes: determining, by the terminal device, whether the second communications system meets a user habit; and if the second communications system meets the user habit, determining, by the terminal device, whether the QoS value of the second communications system meets the QoS requirement of the first application; or determining, by the terminal device, whether use duration of the first application is greater than preset duration; and if the use duration of the first application is greater than the preset duration, determining, by the terminal device, whether the QoS value of the second communications system meets the QoS requirement of the first application.

In this embodiment of this application, the terminal device determines, in a plurality of manners, whether a QoS value of a to-be-switched-to communications system meets a current requirement. The solution is relatively flexible and has a high intelligence degree.

In a possible design, the obtaining, by the terminal device, a QoS value of a second communications system includes: storing, by the terminal device, a correspondence between a geographical location and a QoS parameter set, where the QoS parameter set includes a QoS value of at least one second communications system; obtaining, by the terminal device, a current geographical location of the terminal device; determining, by the terminal device based on the correspondence between a geographical location and a QoS parameter set, a QoS parameter set corresponding to the current geographical location; and selecting, by the terminal device, the QoS value of the second communications system from the determined QoS parameter set.

In this embodiment of this application, the terminal device obtains different QoS values of a communications system at different locations. For example, the terminal device determines the at least one second communications system based on the current geographical location information, and then selects, from the at least one second communications system, a second communications system that meets a current service requirement. According to this manner, the terminal device may find an optimal communications system at different locations. This solution is relatively flexible and has a high intelligence degree.

In a possible design, the obtaining, by the terminal device, a QoS value of a second communications system includes: obtaining, by the terminal device, a correspondence between a signal strength set and a QoS parameter set, where the QoS parameter set includes a QoS value of at least one second communications system, the signal strength set includes a signal strength of the at least one second communications system, and a QoS value in the QoS parameter set are in a one-to-one correspondence with a signal strength in the signal strength set; detecting, by the terminal device, a current signal strength of the at least one second communications system, to obtain a first signal strength set; determining, by the terminal device based on the correspondence between a signal strength set and a QoS parameter set, a QoS parameter set corresponding to the first signal strength set; and selecting, by the terminal device, the QoS value of the second communications system from the determined QoS parameter set.

In this embodiment of this application, the terminal device obtains different signal strengths and different QoS values of a communications system at different locations. The terminal device determines QoS values of a plurality of second communications systems based on current signal strengths of the plurality of second communications systems, and then selects, from the plurality of second communications systems, a second communications system that can meet a current service requirement. According to this manner, the terminal device can find an optimal communications system at different locations. This solution is relatively flexible and has a high intelligence degree.

In a possible design, before the establishing, by a terminal device, a connection to a first communications system, the method further includes: displaying, by the terminal device, an interface of the first application; and after the terminal device establishes the connection to the second communications system, displaying, by the terminal device, second prompt information, where the second prompt information is used to prompt the user with a fact that the terminal device has accessed the second communications system.

In this embodiment of this application, after switching a communications system, the terminal device may prompt the user with a fact that the communications system has been switched, to improve user experience.

In a possible design, the method further includes: displaying, by the terminal device, an interface of the first application, where the interface includes an icon; when the icon is triggered, determining, by the terminal device based on the preset policy and the QoS requirement of the first application, whether the QoS value of the second communications system meets the QoS requirement of the first application; and after the terminal device establishes the connection to the second communications system, displaying, by the terminal device, second prompt information on the interface, where the second prompt information is used to prompt the user with a fact that the terminal device has accessed the second communications system.

In this embodiment of this application, the user may manually trigger the terminal device to select a proper communications system. After switching the communications system based on a trigger operation performed by the user, the terminal device prompts that the communications system has been switched, to improve user experience.

In a possible design, before the establishing, by the terminal device, a connection to the second communications system, the method further includes: determining, by the terminal device based on a correspondence between a power consumption level and a QoS value, at least one power consumption level whose QoS value falls within an interval range between the QoS requirement of the first application and the QoS value of the second communications system; and the establishing, by the terminal device, a connection to the first communications system includes: controlling, by the terminal device based on a control parameter corresponding to a first power consumption level in the at least one power consumption level, the terminal device to connect to the first communications system, where the first power consumption level is a lowest power consumption level in the at least one power consumption level.

In this embodiment of this application, different power consumption levels correspond to different QoS values. The terminal device determines a power consumption level with relatively low power consumption from at least one power consumption level whose QoS value falls within an interval range between the QoS requirement of the first application and a QoS value of a to-be-switched-to communications system, and connects to the to-be-switched-to communications system at the power consumption level. In this manner, power consumption of the terminal device is reduced.

In a possible design, the QoS value in this embodiment of this application includes at least one of a latency, jitter, a packet loss rate, and a throughput.

Certainly, in addition to the foregoing listed parameters, the QoS may be another parameter. This is not limited in this embodiment of this application.

In a possible design, the selecting, by the terminal device, the QoS value of the second communications system from the determined QoS parameter set includes: determining, by the terminal device, that the QoS value of the second communications system is included in a QoS parameter set among determined QoS parameter sets that is closest to a current time.

In this embodiment of this application, because a QoS value of a communications system may change with time, the terminal device selects the QoS parameter set closest to the current time, to improve accuracy.

According to a second aspect, an embodiment of this application provides a terminal device, including one or more processors and one or more memories. The one or more memories are configured to store one or more computer programs. When the one or more computer programs stored in the one or more memories are executed by the one or more processors, the terminal can implement the method in any one of the first aspect or the possible designs of the first aspect.

According to a third aspect, an embodiment of this application further provides a terminal device. The terminal device includes a module/unit that performs the method according to any one of the first aspect or the possible designs of the first aspect. The module/unit may be implemented by hardware, or may be implemented by hardware by executing corresponding software.

According to a fourth aspect, an embodiment of this application further provides a computer readable storage medium. The computer readable storage medium includes a computer program, and when the computer program runs on a terminal, the terminal is enabled to perform the method according to any one of the first aspect or the possible designs of the first aspect.

According to a fifth aspect, an embodiment of this application further provides a computer program product. When the computer program product is run on a terminal device, the terminal device is enabled to perform the method according to any one of the first aspect or the possible designs of the first aspect, or when the computer program product is run on a terminal device, the terminal device is enabled to perform the method according to any one of the second aspect or the possible designs of the second aspect.

DESCRIPTION OF EMBODIMENTS

Figure 1:
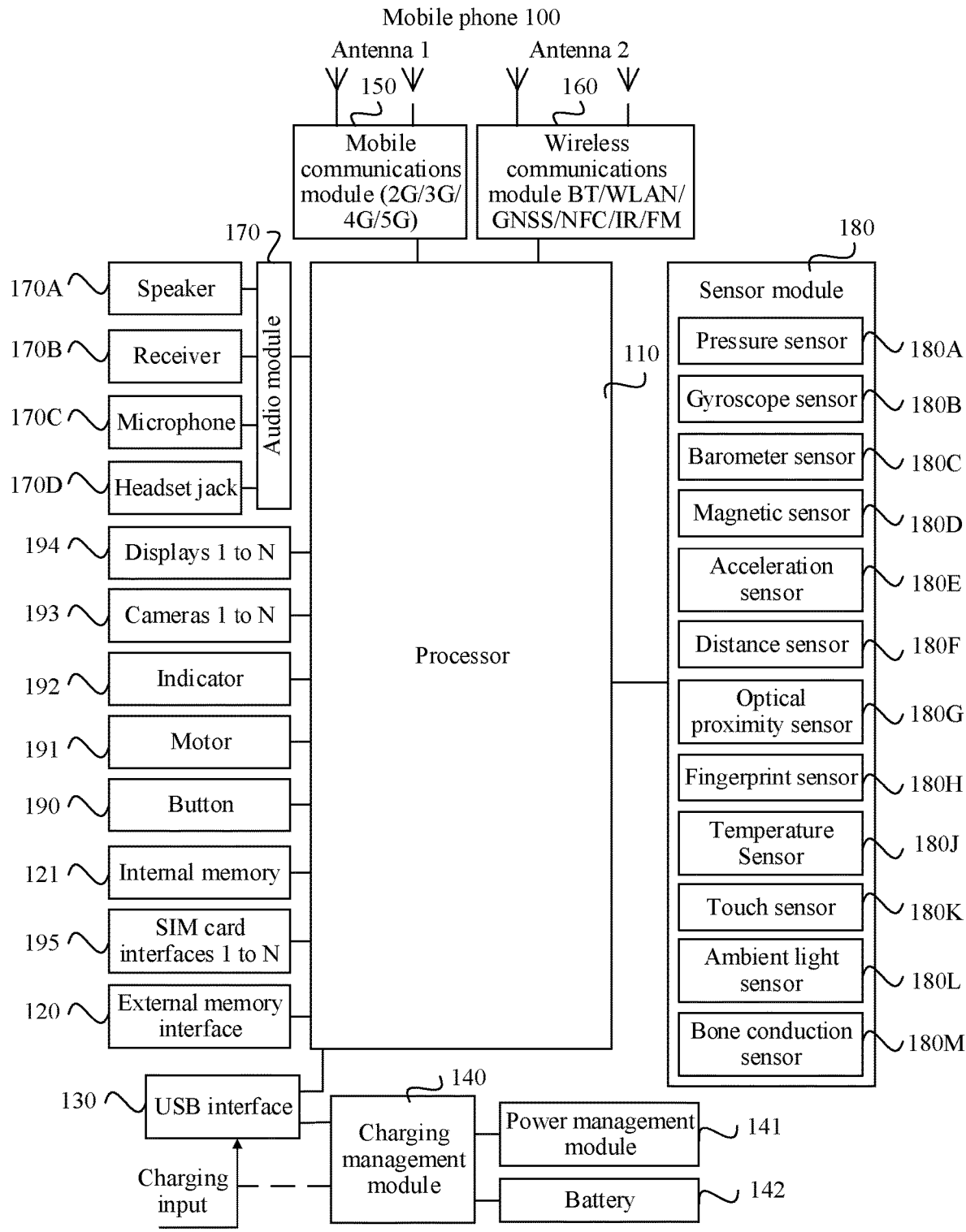
FIG. 1 is a schematic structural diagram of a mobile phone according to an embodiment of the present invention.

The following describes technical solutions in embodiments of this application with reference to accompanying drawings in the embodiments of this application.

The following describes some terms of the embodiments of this application, to help a person skilled in the art have a better understanding.

A communications standard in the embodiments of this application is a network type, for example, a cellular mobile communications network or a wireless local area network communications network. The cellular mobile communications network is, for example, a GSM standard, a CDMA standard, or an LTE standard, and the wireless local area network communications network is, for example, a Wi-Fi 5 GHz standard or a Wi-Fi 2.4 GHz standard.

A communications system in the embodiments of this application is specifically a wireless communications system, for example, a wireless access point (for example, a router) or a base station. Different communications systems may support different communications standards. For example, the base station supports the cellular mobile communications network, for example, the GSM standard, the CDMA standard, or the LTE standard, and the wireless access point supports the wireless local area network communications network, for example, the Wi-Fi 5 GHz standard or the Wi-Fi 2.4 GHz standard.

A QoS parameter in the embodiments of this application may be used to indicate network quality of a communications system. The QoS parameter may include a plurality of parameters such as a latency (which is a time interval between a time at which a trigger action is performed and a time at which a response is received), jitter, a packet loss rate (Loss Ratio, LR for short in English), and a throughput (an amount (in a unit of bit) of useful information transmitted to a specific destination in a unit time). The packet loss rate is a core indicator for measuring packet switching (English full name: Packet Switching, PS for short in English) transmission quality. A higher packet loss rate indicates poorer PS transmission quality, and consequently, results in a more serious damage to a service, and even unavailability of the service. A value of a QoS parameter of a communications system is related to an access amount of the communications system. For example, when the access amount of the communications system is relatively large, the QoS parameter of the communications system is reduced.

A signal strength parameter in the embodiments of this application may be used to indicate a signal strength of a communications system. Different communications systems have different signal strength parameters. For example, when the communications system is a wireless access point, the signal strength parameter may be a received signal strength indicator (Received Signal Strength Indicator, RSSI). When the communications system is a cellular communications system, the signal strength parameter may be a reference signal receiving power (Reference Signal Receiving Power, RSRP), reference signal received quality (Reference Signal Receiving Quality, RSRQ), or the like.

It should be noted that the foregoing QoS parameter is different from the signal strength parameter. For example, a terminal device may simultaneously detect signal strength parameters of a plurality of nearby communications systems, but the terminal device can detect only a QoS parameter of a currently connected communications system. If the terminal device needs to detect a QoS parameter of another communications system, the terminal device needs to disconnect from the currently connected communications system, establish a connection to the another communications system, and then detect the QoS parameter of the another communications system.

In addition, when a signal strength of a communications system is relatively large, a QoS parameter of the communications system is not necessarily large. Therefore, when a signal strength of a communications system is relatively large, if an access amount of the communications system is relatively large, a QoS parameter of the communications system is relatively small.

The following describes a terminal device, a graphical user interface (graphical user interface, GUI) used for such a terminal device, and embodiments for using such a terminal device. In some embodiments of this application, the terminal device may be a portable terminal device, such as a mobile phone, a tablet, or a wearable device (for example, a smartwatch) with a wireless communication function, that includes a function such as a personal digital assistant and/or a music player. An example embodiment of the portable terminal device includes but is not limited to a portable terminal device using iOS®, Android®, Microsoft®, or another operating system. Alternatively, the portable terminal device may be another portable terminal device, for example, a laptop computer (laptop) with a touch-sensitive surface (for example, a touch panel). It should be further understood that in some other embodiments of this application, the terminal device may alternatively be a desktop computer with a touch-sensitive surface (for example, a touch panel), but not a portable terminal device. An example in which the terminal device is a mobile phone is used for description below.

Usually, the terminal device supports a plurality of applications, for example, one or more of the following applications: a drawing application, a presentation application, a word processing application, a game application, a telephone application, a video player application, a music player application, an email application, an instant message sending and receiving application, a photo management application, a camera application, a browser application, a calendar application, a clock application, a payment application, and a health management application. There may be a plurality of instant message sending and receiving applications, for example, an SMS application, an MMS application, various email applications, WeChat, Tencent chatting software (QQ), WhatsApp Messenger, Line (Line), photo sharing (instagram), Kakao Talk, and DingTalk. A user can send information such as a text, a voice message, an image, a video file, or another file to another contact through the instant message sending and receiving application.

For example, the terminal device is a mobile phone. FIG. 1 is a schematic structural diagram of a mobile phone 100.

The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an illustrated structure in the embodiments of the present invention does not constitute a specific limitation on the mobile phone 100. In some other embodiments of this application, the mobile phone 100 may include more or fewer components than those shown in the figure, or combine some components, or divide some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent devices, or may be integrated into one or more processors.

The controller may be a nerve center and a command center of the mobile phone 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

A wireless communication function of the mobile phone 100 may be implemented by using the antenna 1, the antenna 2, the mobile communications module 150, the wireless communications module 160, the modem processor, the baseband processor, and the like.

The antenna 1 and the antenna 2 are configured to: transmit and receive an electromagnetic wave signal. Each antenna in the mobile phone 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution, applied to the mobile phone 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communication solution that is applied to the mobile phone 100 and that include a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, or an infrared (infrared, IR) technology. The wireless communications module 160 may be one or more components integrating at least one communications processor module. The wireless communications module 160 receives an electromagnetic wave by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 of the mobile phone 100 is coupled to the mobile communications module 150, and the antenna 2 is coupled to the wireless communications module 160, so that the mobile phone 100 can communicate with a network and another device by using a wireless communications technology. The wireless communications technology may include a technology such as global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or an IR technology. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS)), and/or a satellite based augmentation system (satellite based augmentation systems, SBAS).

The mobile phone 100 implements a display function by using the GPU, the display 194, the application processor, and the like. The GPU is a microprocessor for image processing, and connects the display 194 to the application processor. The GPU is configured to perform: mathematical and geometric calculation, and render an image. The processor 110 may include one or more GPUs, which execute a program instruction to generate or change display information.

The display 194 is configured to display an image, a video, and the like. The display 194 includes a display panel. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like.

The ISP is configured to process data fed back by the camera 193. For example, the ISP may further perform algorithm optimization on noise, brightness, and complexion of the image. The camera 193 is configured to capture a static image or a video. In some embodiments, the mobile phone 100 may include one or N cameras 193, where N is a positive integer greater than 1.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the mobile phone 100, such as image recognition, facial recognition, speech recognition, and text understanding, can be implemented by using the NPU.

The external memory interface 120 may be configured to connect to an external storage card such as a micro SD card, to extend a storage capability of the mobile phone 100. The external storage card communicates with the processor 110 by using the external memory interface 120, to implement a data storage function. For example, files such as music and a video are stored in the external memory card.

The internal memory 121 may be configured to store computer executable program code, and the executable program code includes an instruction. The processor 110 runs the instruction stored in the internal memory 121, to implement various function applications and data processing of the mobile phone 100. The internal memory 121 may include a program storage area and a data storage area. The program storage area may store an operating system, an application required by at least one function (for example, a voice play function or an image play function), and the like. The data storage area may store data (such as audio data and an address book) created during use of the mobile phone 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The mobile phone 100 may implement an audio function by using the audio module 170, the speaker 170A, the receiver 170B, the microphone 170C, the headset jack 170D, the application processor, and the like, for example, music playing or recording.

The pressure sensor 180A is configured to sense a pressure signal, and can convert the pressure signal into an electrical signal. In some embodiments, the pressure sensor 180A may be disposed on the display 194. When a touch operation is performed on the display 194, the mobile phone 100 detects intensity of the touch operation by using the pressure sensor 180A.

The gyro sensor 180B may be configured to determine a moving posture of the mobile phone 100. The barometric pressure sensor 180C is configured to measure barometric pressure. In some embodiments, the mobile phone 100 calculates an altitude by using the barometric pressure measured by the barometric pressure sensor 180C, to assist in positioning and navigation.

The magnetic sensor 180D includes a Hall sensor. The mobile phone 100 may detect opening and closing of a flip leather case by using the magnetic sensor 180D. The acceleration sensor 180E may detect values of acceleration in various directions (usually on three axes) of the mobile phone 100. The distance sensor 180F is configured to measure a distance. The optical proximity sensor 180G may detect infrared reflected light from a nearby object. When sufficient reflected light is detected, it may be determined that there is an object near the mobile phone 100. The ambient light sensor 180L is configured to sense ambient light brightness. The fingerprint sensor 180H is configured to collect a fingerprint. The mobile phone 100 may use a feature of the collected fingerprint to implement fingerprint unlocking, application access locking, fingerprint photographing, fingerprint call answering, and the like. The temperature sensor 180J is configured to detect a temperature. The touch sensor 180K may also be referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation on or near the touch sensor 180K. The touch sensor may transmit the detected touch operation to the application processor to determine a type of the touch event. A visual output related to the touch operation may be provided by using the display 194. The bone conduction sensor 180M may obtain a vibration signal.

The button 190 includes a power button, a volume button, and the like. The button 190 may be a mechanical button, or may be a touch button. The mobile phone 100 receives key input, and generates key signal input related to a user setting and function control of the mobile phone 100.

The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or plugged from the SIM card interface 195, to implement contact with or separation from the mobile phone 100.

The charging management module 140 is configured to receive a charging input from the charger. The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance).

It can be learned from the foregoing content that in the prior art, when switching a communications system, the mobile phone 100 needs to disconnect from a currently connected communications system. After switching to another communications system, the mobile phone 100 detects whether a QoS value of the another communications system is greater than a QoS value of the currently connected communications system. If the QoS value of the another communications system is greater than the QoS value of the currently connected communications system, the mobile phone 100 connects to the another communications system. In this process, a service currently running on the mobile phone 100 is affected.

Therefore, an embodiment of this application provides a communications system switching method. The method may be applied to the mobile phone 100 shown in FIG. 1 or another electronic device that can perform a communications service. The mobile phone 100 is used as an example. In the method, the mobile phone 100 may detect a QoS value of each communications system in advance, and store the QoS value for use. For example, the mobile phone 100 stores a correspondence between geographical location information and a QoS value of a communications system, or stores a correspondence between a signal strength and a QoS value of the communications system (the two correspondences may further include other parameters such as time information, a user habit, and a current application, so that the mobile phone 100 selects a most proper communications system based on these parameters. Details are described below). Alternatively, the mobile phone 100 obtains a QoS value of each communications system from another device, for example, actively or passively obtains the QoS value from the another terminal device by using a wired or wireless communications protocol. In this way, the mobile phone 100 may determine a QoS value of each communications system based on a geographical location or a signal strength, and then the mobile phone 100 selects a communications system that can better meet a current service requirement (a specific process is described below), and connects to the communications system. Therefore, in the communications system switching method provided in this embodiment of this application, because the mobile phone 100 knows the QoS value of each communications system in advance, the mobile phone 100 may learn, without interrupting a currently connected communications system, a communications system whose QoS value can better meet a current service requirement, and the mobile phone 100 may directly switch to the communications system without interrupting the currently connected communications system. After establishing a connection to another communications system, the mobile phone 100 detects whether a QoS value of the another communications system meets the current service requirement. In this way, there is relatively small impact on a currently running service.

It should be noted that, it can be learned from the foregoing content that the QoS value of each communications system dynamically changes (for example, when an access amount of a communications system is relatively large, the QoS value of the communications system decreases). Therefore, the mobile phone 100 may detect (update) the QoS value of each communications system in real time, namely, learn of the foregoing two correspondences.

Manner 1: The mobile phone 100 may automatically learn of the foregoing two correspondences.

For example, the mobile phone 100 starts learning when the mobile phone 100 is used (for example, activated) for the first time; or the mobile phone 100 may periodically start learning; or the mobile phone 100 starts learning when detecting that the mobile phone 100 moves; or the mobile phone 100 starts learning each time the mobile phone 100 is powered on; or the mobile phone 100 starts learning when detecting that a user currently does not operate the mobile phone; or the mobile phone 100 may start learning within a preset time period (which is set when the mobile phone 100 is at delivery, or is user-defined).

Optionally, in a process of learning of the foregoing two correspondences, the mobile phone 100 may comprehensively consider at least one of the foregoing plurality of cases. For example, when the mobile phone 100 detects that the mobile phone 100 moves and the user does not operate the mobile phone 100 currently, the mobile phone 100 starts learning. Because the mobile phone 100 needs to establish a connection to each communications system before detecting the QoS value of the communications system, the mobile phone 100 at a different location and in an "idle" state (in a case in which a current service is not affected as much as possible) may automatically connect to each communications system to detect the QoS value of each communications system.

Manner 2: The user actively triggers the mobile phone 100 to learn of the foregoing two correspondences.

For example, a portal may be disposed on the mobile phone 100, and the portal is used to trigger the mobile phone 100 to learn of the foregoing two correspondences. The portal (for example, an icon) may be set on any interface of the mobile phone 100, for example, a lock interface, a home screen, or an application display interface. The user may actively trigger, based on a requirement of the user, the mobile phone 100 to learn of the foregoing two correspondences.

The foregoing describes a case in which the mobile phone 100 may passively or actively obtain the two correspondences. The following describes a specific process in which the mobile phone 100 obtains the two correspondences. Because the two correspondences are used, the following first describes the correspondence between a geographical location and a QoS value of a communications system, and then describes the correspondence between a signal strength and a QoS value of a communications system.

Figure 2:
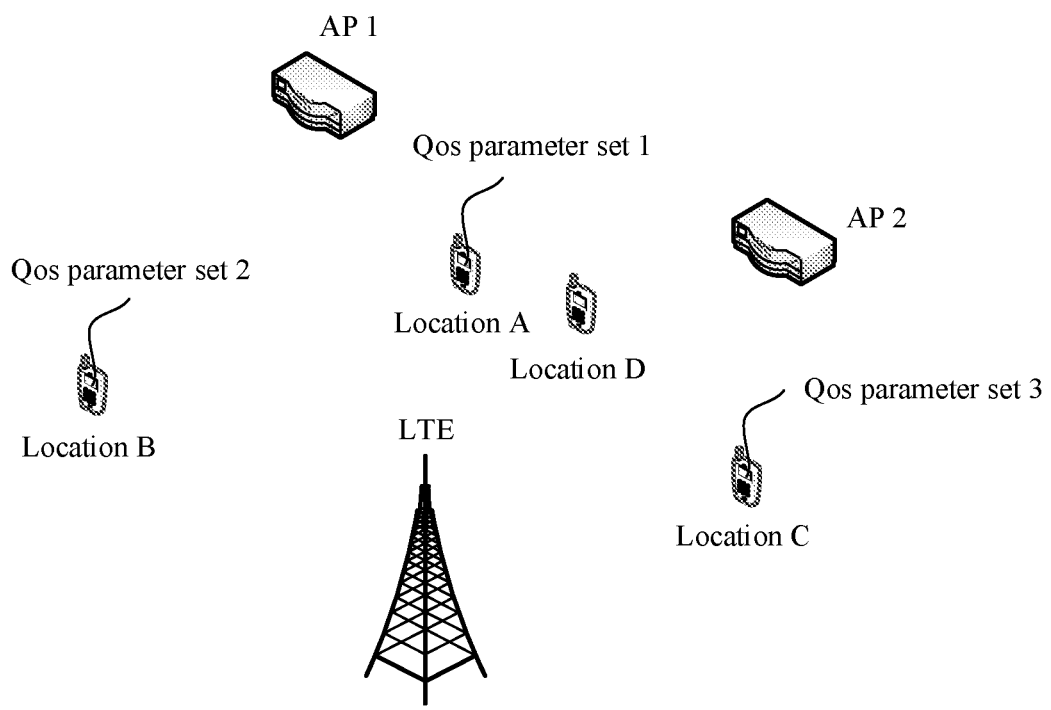
FIG. 2 is a schematic diagram of an application scenario according to an embodiment of the present invention.

A process in which the mobile phone 100 obtains the correspondence between a geographical location information and a QoS value of each communications system is as follows:

FIG. 2 is a schematic diagram of an application scenario according to an embodiment of this application. As shown in FIG. 2, the application scenario includes three communications systems, respectively corresponding to an AP 1, an AP 2, and an LTE base station (the three communications systems respectively support different communications standards). The mobile phone detects respective QoS parameters of the three communications systems at a location A, to obtain a QoS parameter set 1 at the location A. The QoS parameter set 1 includes respective QoS parameters of the AP 1, the AP 2, and the LTE base station at the location A.

Specifically, when detecting the QoS parameter of each communications system at the location A, the mobile phone 100 may separately establish connections to communications systems corresponding to different QoS parameters, to detect the QoS parameter of each communications system. For example, at the location A, the mobile phone 100 first connects to the AP 1, detects a QoS parameter of the AP 1, disconnects from the AP 1, connects to the AP 2, and detects a QoS parameter of the AP 2.

Similarly, the mobile phone separately detects the QoS parameters of the three communications systems at a location B and a location C, to obtain a QoS parameter set 2 at the location B and a QoS parameter set 3 at the location C. The mobile phone stores the location A, the location B, the location C, and the QoS parameter sets 1 to 3 for use.

It is assumed that the mobile phone detects a current location, for example, a location D. If a distance between the location D and the location A is less than a preset distance, the mobile phone 100 determines a proper QoS parameter in the QoS parameter set 1 according to a preset policy, and connects to a communications system corresponding to the QoS parameter. The preset policy may be that the mobile phone 100 selects a QoS parameter with a maximum value from the QoS parameter set 1; or the mobile phone 100 selects a proper QoS parameter from the QoS parameter set 1 based on a QoS requirement of a currently running application (for example, the mobile phone 100 selects, from the QoS parameter set 1, a communications system whose QoS value is greater than the QoS requirement of the currently running application); or the mobile phone 100 selects a proper QoS parameter from the QoS parameter set 1 based on a user habit; or the mobile phone 100 selects a proper QoS parameter from the QoS parameter set 1 based on a price (for example, when a currently running application of the mobile phone 100 needs to consume relatively large traffic, the mobile phone 100 selects the AP 1 or the AP 2 from the QoS parameter set 1, but does not select LTE). Specific content is described below.

Figure 3:
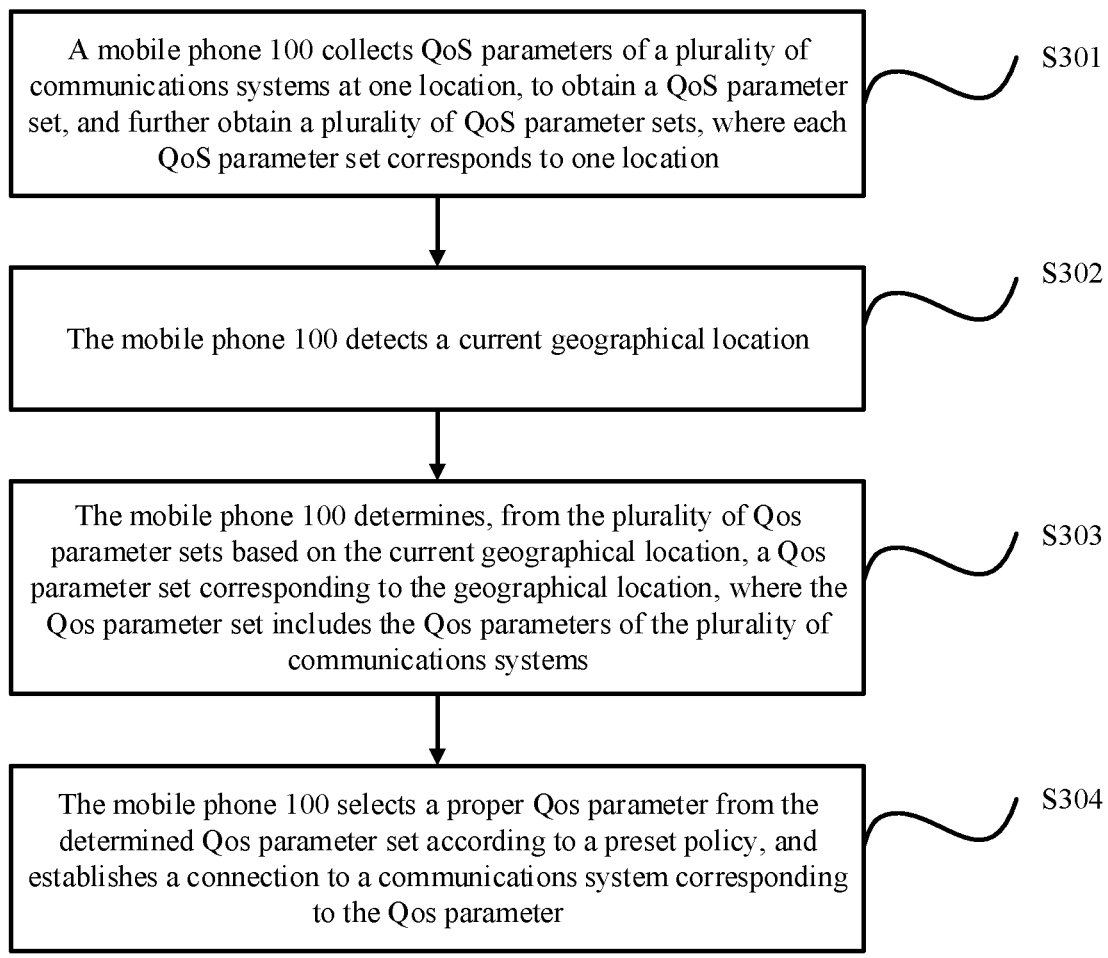
FIG. 3 is a schematic flowchart of a communications system selection method according to an embodiment of the present invention.

FIG. 3 is a schematic flowchart of a communications system switching method according to an embodiment of this application. The method may be applied to the mobile phone shown in FIG. 1 or another electronic device. In the following description, the mobile phone 100 is used as an example for description, and the application scenario shown in FIG. 2 is used as an example. As shown in FIG. 3, a procedure of the method includes the following steps.

S301: The mobile phone 100 obtains a plurality of QoS parameter sets, where each QoS parameter set corresponds to one location. For example, QoS parameters of a plurality of communications systems are detected at one location to obtain a QoS parameter set, and the location is changed to obtain a plurality of QoS parameter sets. Each QoS parameter set corresponds to one location.

In this embodiment of this application, the QoS parameter may include a plurality of types of parameters such as a latency, jitter, a packet loss rate, and a throughput. In the following description, that the QoS parameter is a throughput is used as an example.

Still referring to FIG. 2, the mobile phone 100 detects, at the location A, the respective QoS parameters such as throughputs of the three communications systems (for example, the mobile phone 100 is at the location A, first connects to the AP 1, detects the QoS parameter of the AP 1, disconnects from the AP 1, connects to the AP 2, detects the QoS parameter of the AP 2, disconnects from the AP 2, connects to the LTE, and detects the QoS parameter of the LTE). It is assumed that the mobile phone 100 detects that a throughput of the AP 1 is 90 GB, a throughput of the AP 2 is 70 GB, and a throughput of the base station is 90 GB. To be specific, the mobile phone 100 obtains the QoS parameter set 1 (90 GB, 70 GB, and 90 GB) at the location A. Similarly, the mobile phone 100 may obtain the QoS parameter set 2 at the location B, and obtain the QoS parameter set 3 at the location C. Table 1 shows a mapping relationship between location information and a QoS parameter set.

TABLE 1

| Location | AP 1 (QoS value) | AP 2 (QoS value) | Base station (QoS value) | QoS parameter set |
|---|---|---|---|---|
| Location A | 90 GB | 70 GB | 30 GB | QoS parameter set 1 (90 GB, 70 GB, and 30 GB) |
| Location B | 50 GB | 20 GB | 60 GB | QoS parameter set 2 (50 GB, 20 GB, and 60 GB) |
| Location C | 30 GB | 50 GB | 60 GB | QoS parameter set 3 (30 GB, 50 GB, and 60 GB) |

It should be noted that the QoS value of each communications system in Table 1 may be detected by the mobile phone 100 in advance (for example, before a current time, the mobile phone 100 has established connections to communications systems corresponding to different QoS parameters, and detects QoS parameters of each communications system). Therefore, it is assumed that the mobile phone 100 currently connects to the AP 1. If the mobile phone 100 needs to switch from the AP 1 to another communications system, the mobile phone 100 does not need to interrupt a connection to the AP 1, and then establishes a connection to the another communications system to detect a QoS parameter of the another communications system. Only a communications system to which a connection is to be established needs to be determined based on the QoS value that is of the another communications system and that is recorded in Table 1. Table 1 is merely an example, and does not limit a mapping relationship between location information and a QoS parameter set. In addition, the location A, the location B, or the location C in Table 1 may be geographical coordinate information such as longitude and latitude, or may be geographical location information such as an administrative region, a street, and a house number. In addition, Table 1 may further include collection time information, information about an application running during collection, and the like.

S302: The mobile phone 100 detects a current geographical location.

For example, similar to the location determining method in step S301, the mobile phone 100 may perform positioning by using one or more methods such as a GPS, a base station, a Wi-Fi hotspot, Bluetooth (iBacon), and an assisted GPS (assisted GPS, AGPS).

S303: The mobile phone 100 determines, from the plurality of QoS parameter sets based on the current geographical location, a QoS parameter set corresponding to the geographical location, where the QoS parameter set includes the QoS parameters of the plurality of communications systems.

In an example, still referring to FIG. 2, it is assumed that a mobile phone of a user detects that the current geographical location is a location D. The mobile phone 100 queries whether the location D exists in Table 1. If the location D exists, the mobile phone 100 determines, according to Table 1, a QoS parameter set corresponding to the location D. If the mobile phone 100 does not find the location D in Table 1, the mobile phone 100 determines a location that is among the location A, the location B, and the location C and that is closest to the location D. Assuming that the location A is closest to the location D, the mobile phone 100 determines that the QoS parameter set corresponding to the location D is the QoS parameter set 1.

The mobile phone 100 determines, based on the QoS parameter set 1, a communications system whose QoS parameter has a largest value, and connects to the communications system whose QoS parameter has a largest value. For example, if the QoS parameter set 1 (90 GB, 70 GB, and 70 GB) indicates that the QoS parameter of the AP 1 has the largest value, the mobile phone 100 connects to the AP 1.

Table 1 is merely an example. Actually, when detecting the QoS parameter of each communications system, the mobile phone 100 may further consider another factor. The following lists several examples.

Example 1: The QoS parameter of each communications system may have different values in different time periods. The AP 1 is used as an example. In a period from 10:00 to 12:00 in the evening, the AP 1 has a relatively large access amount, and consequently, the QoS parameter of the AP 1 has a relatively low value. However, in a period from 6:00 to 8:00 in the morning, the AP 1 has a relatively small access amount, and consequently, the QoS parameter of the AP 1 has a relatively high value.

Therefore, the mobile phone 100 may consider time information when detecting the QoS parameters of each communications system at a location. That is, the mobile phone 100 may collect statistics about the QoS parameter of each communications system at a location in each time period. The application scenario shown in FIG. 2 is used as an example. Table 2 shows QoS values of communications systems at each location in different time periods.

TABLE 2

| Location | Time period | AP 1 (QoS value) | AP 2 (QoS value) | Base station (QoS value) | QoS parameter set |
|---|---|---|---|---|---|
| Location A | 10:00-12:00 | 90 GB | 70 GB | 30 GB | QoS parameter set 1.1 (90 GB, 70 GB, and 30 GB) |
|  | 6:00-8:00 | 120 GB | 90 GB | 50 GB | QoS parameter set 1.2 (120 GB, 90 GB, and 50 GB) |
| Location B | 10:00-12:00 | 50 GB | 20 GB | 60 GB | QoS parameter set 2 (50 GB, 20 GB, and 60 GB) |
| Location C | 10:00-12:00 | 30 GB | 50 GB | 60 GB | QoS parameter set 3 (30 GB, 50 GB, and 60 GB) |

For example, it is assumed that a mobile phone of the user detects that a current geographical location is a location D and a current time is 13:00. The mobile phone 100 queries whether the location D and the current time 13:00 exist in Table 2, and searches, in Table 2, for a location and a time period that correspond to the location D. If the location D and the current time 13:00 exist in Table 2, the mobile phone 100 determines a QoS parameter set that corresponds to both the location and the time period. If the mobile phone 100 does not find the location D in Table 2 or a time period including the current time, the mobile phone 100 determines a location that is among the location A, the location B, and the location C and that is closest to the location D, and a time period that is closest to the current time. It is assumed that the location A is closest to the location D, and a time period that is closest to the current time is 10:00 to 12:00. In this case, it is determined that the QoS parameter set corresponding to the location D and the current time 13:00 is the QoS parameter set 1.1.

Example 2: The user may manually select, based on a requirement of the user, to establish a connection to a communications system. The mobile phone 100 may record an operation performed by the user. Table 3 shows still another example of the location information and the QoS parameter set.

TABLE 3

| Location | User Select | AP 1 (QoS value) | AP 2 (QoS value) | Base station (QoS value) | QoS parameter set |
|---|---|---|---|---|---|
| Location A | AP 2 | 90 GB | 70 GB | 30 GB | QoS parameter set 1 (90 GB, 70 GB, and 30 GB) |
| Location B | AP 1 | 50 GB | 20 GB | 60 GB | QoS parameter set 2 (50 GB, 20 GB, and 60 GB) |
| Location C | AP 1 | 30 GB | 50 GB | 60 GB | QoS parameter set 3 (30 GB, 50 GB, and 60 GB) |

For example, the mobile phone 10 detects that the mobile phone 10 is currently at the location A, and the mobile phone 100 determines, according to Table 3, that a communications system selected by the user is the AP 2. Therefore, the mobile phone establishes a connection to the AP 2.

In this embodiment of this application, Table 1, Table 2, or Table 3 may be user-defined, or may be self-learned by the mobile phone. Certainly, Table 3 may also include time information and information about a running application, so that the electronic device performs more complex and accurate matching.

In this embodiment of this application, Table 1, Table 2, or Table 3 may be updated. Table 1 is used as an example. The electronic device may update Table 1 in a plurality of manners. An update condition for updating the foregoing tables may be preset in the device when the electronic device is at delivery, or may be set and changed by the user.

Manner 1: The mobile phone may automatically update Table 1 at a specific period.

As described above, the mobile phone 100 needs to disconnect from the currently connected communications system and establish a connection to another communications system, so as to detect a QoS parameter of the another communications system. If the mobile phone disconnects from the current communications system, frame freezing may occur in a current running service of the mobile phone. Therefore, the mobile phone 100 may periodically and automatically update Table 1 in a preset time period. The preset time period may be determined by the mobile phone 100 through self-learning or may be user-defined. For example, the user specifies that the mobile phone updates Table 1 at 2:00 in the afternoon every day. For another example, the mobile phone 100 may update Table 1 when the user currently does not operate the mobile phone (for example, when the user currently does not operate the mobile phone, the mobile phone 100 may disconnect from the currently connected communications system, and establish a connection to another communications system, to detect a QoS parameter of the another communications system). For another example, the mobile phone 100 may further automatically update Table 1 based on a preset condition. To be specific, each time after the mobile phone 100 establishes a connection to a communications system (the user may manually establish the connection), the mobile phone 100 detects a QoS parameter of the communications system, and then updates Table 1.

Manner 2: The user manually updates Table 1.

For example, a portal (for example, a switch control, a specific gesture, a voice instruction, or a specific fingerprint) may be disposed on the mobile phone. When the mobile phone detects the entry, for example, when the switch control is triggered, Table 1 is updated. For example, the switch control may be disposed in an app (for example, a setting app) in the mobile phone.

Manner 3: The mobile phone 100 updates a correspondence table when determining that the correspondence table needs to be updated. For example, when determining that Table 1 is inaccurate, the mobile phone 100 updates Table 1. For example, it is detected that the user makes a new selection, it is detected that the mobile phone 100 moves to a new location, or it is detected that a new communications system can be connected.

For example, the mobile phone 100 detects that the mobile phone 100 is currently located at the location A, determines, according to Table 1, the QoS parameter set 1 corresponding to the location A, and determines, based on the QoS parameter set 1, that the mobile phone 100 connects to the AP 1. After the mobile phone 100 connects to the AP 1, the mobile phone 100 detects the QoS parameter of the AP 1. If the detected QoS parameter set is less than the QoS parameter of the AP 1 in the stored QoS parameter set 1, it indicates that the stored QoS parameter of the AP 1 is inaccurate, and the mobile phone 100 may update Table 1.

S304: The mobile phone 100 selects a proper QoS parameter from the determined QoS parameter set according to a preset policy, and establishes a connection to a communications system corresponding to the QoS parameter.

The mobile phone 100 selects the proper QoS parameter from the determined QoS parameter set according to the preset policy in a plurality of implementations. Manner 1: After determining the QoS parameter set, the mobile phone 100 may determine a communications system whose QoS parameter has a largest value in the QoS parameter set. Manner 2: The mobile phone 100 may determine a communications system that is in the QoS parameter set and that can meet a QoS requirement of a currently running application. For example, the mobile phone 100 selects a communications system whose QoS value is greater than a requirement of the currently running application. Manner 3: The mobile phone 100 selects a proper communications system based on a user habit. For example, when watching a movie by using the mobile phone 100, the user usually manually connects the mobile phone 100 to the AP 1. In this case, when detecting that a movie is currently played, the mobile phone 100 automatically switches to connect to the AP 1.

Optionally, in addition to the foregoing three manners, the mobile phone 100 may consider another condition. For example, the mobile phone 100 selects a proper communications system based on information such as duration of using a current application or a possibility of switching the current application by the user. For example, if the mobile phone 100 detects that the user opens an application that has a very high QoS requirement, but detects that use duration of the application is less than preset duration, for example, less than two minutes, the mobile phone 100 exits the application. In this case, the mobile phone 100 may not need to switch a communications system. Alternatively, the mobile phone 100 detects that the user uses only one function that does not have a high QoS requirement in the application. In this case, the mobile phone 100 may not need to select a communications system with a very large QoS value, and only needs to select a communications system whose QoS value is greater than or equal to a QoS requirement of the function. For example, when the user uses a WeChat application in the mobile phone 100, if only chatting (sending of a text or an image) in WeChat is used, the mobile phone 100 may select a communications system with a relatively small QoS (for example, a latency) value. If a video/voice call in the WeChat application is used, the mobile phone 100 may select a communications system with a relatively high QoS (for example, a latency) value. The mobile phone 100 may further perform selection with reference to costs of each communications system, a use habit of the user, and the like. For example, the user is watching a video, but it can be learned, based on a historical use habit/work habit that is of the user and that is recorded by the mobile phone 100 (recorded by another APP), that the user closes the video after watching the video for only a few minutes. In this case, only a communications system that can ensure a current video requirement and that has low costs needs to be connected, without a need to switch to another communications system that can provide higher viewing experience and that has high costs.

Manner 2 is used as an example below, to describe a process in which the mobile phone 100 selects a communications system.

For example, the mobile phone 100 stores a mapping relationship between an application and a QoS requirement. Table 4 shows an example of a mapping relationship between an application and a QoS requirement (for example, a throughput). A QoS requirement of each application in Table 4 may be defined when each application is released, or may be user-defined.

TABLE 4

| Application | QoS requirement |
|---|---|
| WeChat | 30 GB |
| Phone | 50 GB |
| iQIYI | 80 GB |

For example, the mobile phone 100 is currently running iQIYI, and determines, according to Table 4, that a QoS requirement of iQIYI is 80 GB. It is assumed that the mobile phone is currently located at the location A, and the mobile phone determines, according to Table 1, that a QoS parameter set corresponding to the location A is the QoS parameter set 1. The mobile phone 100 determines a communications system, namely, the AP 1, whose QoS parameter has a value greater than 80 GB in the QoS parameter set 1. The mobile phone 100 establishes a connection to the AP 1.

For another example, the mobile phone 100 is currently running WeChat, and determines, according to Table 4, that a QoS requirement of WeChat is 30 GB. It is assumed that the mobile phone is currently located at the location A, and the mobile phone determines, according to Table 3, that a QoS parameter set corresponding to the location A is the QoS parameter set 1. The mobile phone 100 determines that there are two communications systems, namely, the AP 1 and the AP 2, whose QoS parameters have values greater than 30 GB in the QoS parameter set 1. The mobile phone 100 may establish a connection to the AP 2 based on a selection of the user.

It should be noted that in the foregoing examples (in Table 1 to Table 4) that the QoS parameter is a throughput is only used as an example. Actually, the QoS parameter may alternatively be a latency, jitter, a packet loss rate, a packet error ratio, or the like. To be specific, the QoS parameter in Table 1 to Table 4 may be one or more of these parameters.

Usually, different applications have different requirements on a latency, a throughput, a packet loss rate, and the like. For example, a streaming class service and a voice service have a relatively high requirement for the latency or the jitter but has a low requirement for the packet loss rate or the packet error rate. The streaming class service is, for example, an audio or video playing service (for example, a music/video playing application, an education application, or a fitness application in the mobile phone 100). The voice service is, for example, a voice service on a circuit switching carrier (for example, a GSM voice service). For another example, there is IP phone and video phone (for example, an application such as IP phone/video phone in the mobile phone 100). For these applications, the mobile phone 100 may select a communications system whose latency or jitter meets a requirement of the applications (for example, select a communications system whose latency is greater than a latency requirement of the application).

For example, it is assumed that the mobile phone 100 currently runs an audio play application. The mobile phone 100 determines, based on a correspondence between a geographical location and a QoS parameter set (a latency), a QoS parameter set corresponding to a current geographical location, determines, in the QoS parameter set, a communications system whose latency is greater than a latency requirement of music playing, and connects to the communications system.

For another example, an interactive service and a background service have a relatively low requirement for the latency or the jitter but have a relatively high requirement for the packet loss rate. The interactive service is, for example, a service that a terminal device (for example, a mobile phone 100, a human, or another machine) and a remote device (for example, a remote server) perform online data interaction, for example, may be web browsing, database retrieval, or an online game (for example, a tool/dictionary/shopping/chat/game application in the mobile phone 100). The background service is, for example, receiving an e-mail in the background, SMS, or receiving some files and downloading a database (for example, an e-mail application in the mobile phone 100). For these applications, the mobile phone 100 may select a communications system whose packet loss rate meets a requirement of the applications (for example, select a communications system whose packet loss rate is less than a packet loss rate requirement of the application).

For example, it is assumed that the mobile phone 100 currently runs an online game. The mobile phone 100 determines, based on a correspondence between a geographical location and a QoS parameter (a packet loss rate), a QoS parameter set corresponding to a current geographical location, determines, in the QoS parameter set, a communications system whose packet loss rate is less than a packet loss rate requirement of the online game, and connects to the communications system.

It can be learned from the foregoing example that the mobile phone 100 may select the communications system in a plurality of manners. In actual application, the mobile phone 100 may select the communications system in one or more of the foregoing manners, or in a manner other than the foregoing manners.

It should be noted that all or some steps (for example, S302 to S305) in the embodiment shown in FIG. 3 may be always performed. For example, S302 to S305 are always performed provided that the mobile phone 100 is in a power-on state.

Certainly, all or some steps (for example, S302 to S305) in the embodiment shown in FIG. 3 may alternatively be performed only when a condition is met. For example, when detecting that the current location changes, the mobile phone 100 performs once all or some steps (for example, S302 to S305) shown in FIG. 2. For another example, when the mobile phone 100 detects that QoS of the currently connected communications system does not meet a current service requirement/user requirement, or current power consumption is relatively high (greater than preset power consumption), all or some steps (for example, S302 to S305) shown in FIG. 3 are performed. In this manner, frequent switching may be avoided, a calculation amount is reduced, and power consumption is reduced.

In the foregoing embodiment, several manners in which the mobile phone determines a proper communications system from a plurality of communications systems are described. In all these manners, a current location of the mobile phone needs to be known. Another embodiment is described below. In this embodiment, a mobile phone may determine a proper communications system from a plurality of communications systems without a need to know a current location of the mobile phone.

Figure 4:
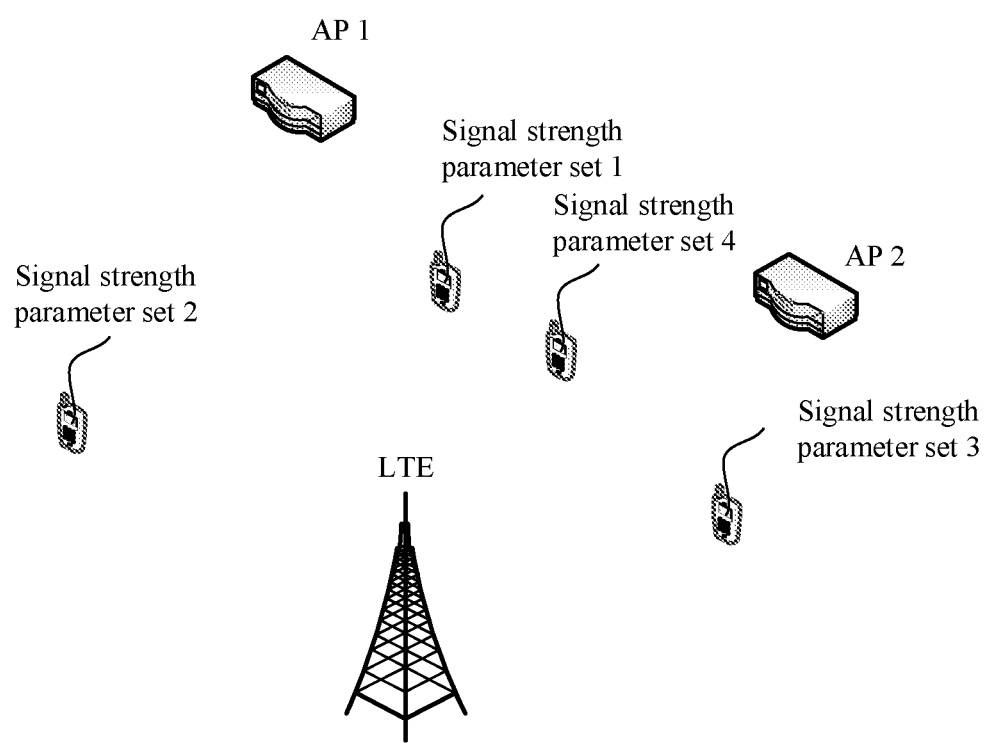
FIG. 4 is a schematic diagram of an application scenario according to an embodiment of the present invention.

FIG. 4 is a schematic diagram of an application scenario according to an embodiment of this application. As shown in FIG. 4, the application scenario includes three communications systems, respectively corresponding to an AP 1, an AP 2, and an LTE base station (the three communications systems respectively support different communications standards). A mobile phone 100 detects respective signal strength parameters of the three communications systems at a location, to obtain a signal strength parameter set 1 at the location. Similarly, the mobile phone separately detects signal strength parameters of the three communications systems at other two locations, to obtain two signal strength parameter sets, namely, a signal strength parameter set 2 and a signal strength parameter set 3. The mobile phone stores the signal strength parameter sets 1 to 3 for use.

Optionally, the mobile phone 100 may detect a QoS value of each communications system when detecting a signal strength of the communications system. For example, the mobile phone 100 detects a signal strength and a QoS value of the currently connected AP 1, disconnects from the AP 1, and connects to the AP 2, to detect a signal strength and a QoS value of the AP 2. Alternatively, when detecting a signal strength of each communications system, the mobile phone 100 does not need to establish a connection to each communications system. For example, the mobile phone 100 may detect the signal strength of the communications system by detecting broadcast information of the communications system. Therefore, that the mobile phone 100 may detect the signal strength of each communications system and that the mobile phone 100 may detect the QoS value of each communications system are two independent processes. For example, the mobile phone 100 detects the signal strengths of all communications systems at a location to obtain a signal strength set, and then detects the QoS value of each communications system. For example, the mobile phone 100 first detects the signal strengths of the AP 1, the AP 2, and the LTE, to obtain the signal strength set. Then, the mobile phone 100 connects to the AP 1, detects a QoS parameter of the AP 1, disconnects from the AP 1, connects to the AP 2, detects a QoS parameter of the AP 2, disconnects from the AP 2, connects to the LTE, detects a QoS parameter of the LTE, and obtains a QoS parameter set. After obtaining the signal strength set and the QoS parameter set, the mobile phone 100 may establish a correspondence (described below) between the signal strength set and the QoS parameter set, and store the correspondence for use.

It is assumed that the mobile phone 100 detects a current signal strength of each communications system, to obtain a signal strength parameter set 4. The mobile phone may search the stored signal strength parameter sets 1 to 3 for a signal strength parameter set that matches the signal strength parameter set 4. It is assumed that the mobile phone 100 performs matching, and determines that the signal strength parameter set 1 matches the signal strength parameter set 4. In this case, the mobile phone 100 determines, based on the signal strength parameter set 1 and the foregoing correspondence between a signal strength parameter set and a QoS parameter set, a QoS parameter set corresponding to the strength parameter set 1, selects a communications system from the QoS parameter set according to a preset policy, and connects to the communications system.

The preset policy has been described above. For brevity of this specification, details are not described herein again.

This embodiment (the embodiment shown in FIG. 4) is different from the foregoing embodiment (the embodiment shown in FIG. 3). In the foregoing embodiment, the mobile phone 100 detects geographical location information, determines a QoS parameter set based on the geographical location information, and further determines a proper communications system. In this embodiment, the mobile phone 100 does not need to detect geographical location information, but determines a QoS parameter set based on a detected signal strength set, to determine a proper communications system. Certainly, the mobile phone 100 may select the solution in the foregoing embodiment or the solution in this embodiment to implement switching between communications systems. To be specific, the solutions in the two embodiments may be independently applied. Alternatively, when the mobile phone 100 can obtain a geographical location, the solution of the foregoing embodiment is used; or when the mobile phone 100 cannot obtain a geographical location, the solution in this embodiment is used.

Figure 5:
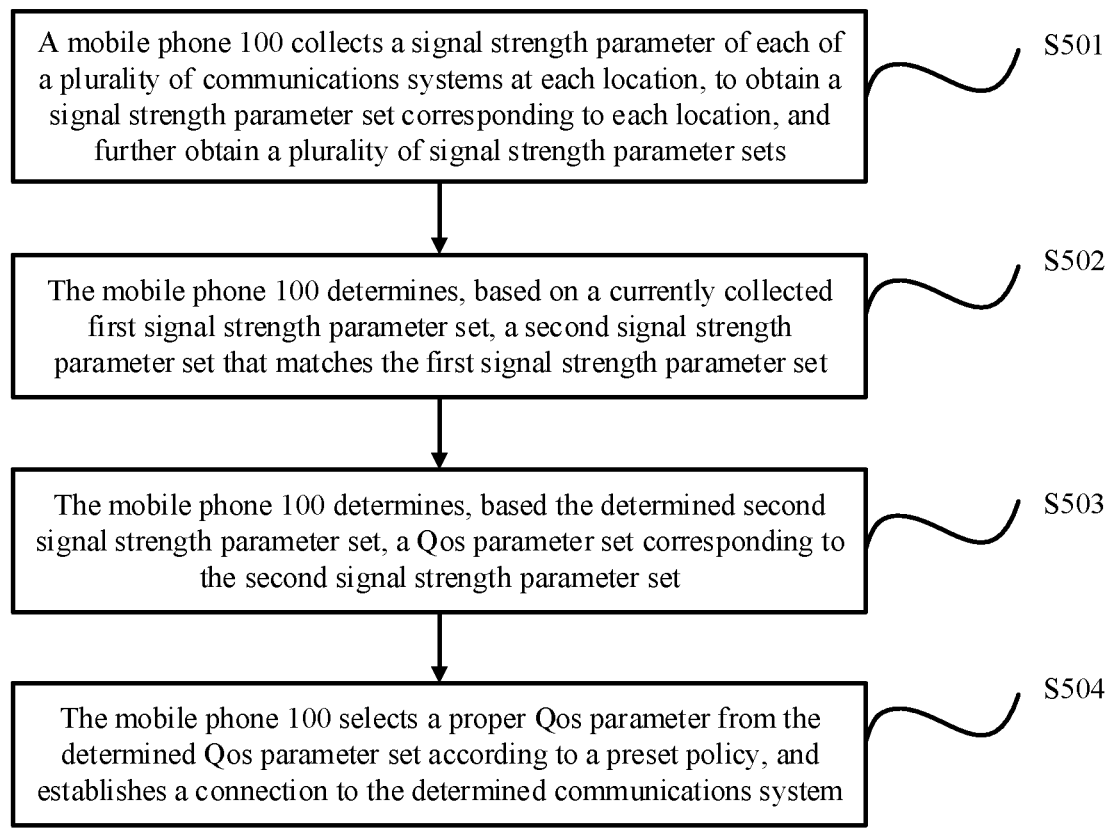
FIG. 5 is a schematic flowchart of another communications system selection method according to an embodiment of the present invention.

FIG. 5 is a flowchart of another communications system switching method according to an embodiment of this application. The method may be applied to the mobile phone 100 shown in FIG. 1 or another terminal device. The following uses the mobile phone 100 as an example, and uses the application scenario shown in FIG. 4 as an example. As shown in FIG. 5, a procedure of the method includes the following steps.

S501: The mobile phone 100 detects a signal strength parameter of each of a plurality of communications systems at a plurality of locations, to obtain a signal strength parameter set corresponding to each location, and further obtain a plurality of signal strength parameter sets.

In this embodiment of this application, the mobile phone 100 may detect signal strength parameter sets of the plurality of communications systems each time the mobile phone 100 is started; or the mobile phone may periodically detect signal strength parameter sets of the plurality of communications systems; or the mobile phone may detect signal strength parameter sets of the plurality of communications systems when a user actively triggers detection. Because a signal strength of a communications system can be detected without a need to establishing a connection to the communications system, an action of detecting signal strength parameters of the plurality of communications systems may be performed in a plurality of cases. For example, the user manually triggers the action, or the action is automatically performed when a device meets a preset condition (for example, the device is in an idle mode, the action is periodically performed, it is detected that a location changes, or the user switches an application). There may be a plurality of signal strength parameters. For example, when a communications system is a wireless access point, the signal strength parameter may be a received signal strength indicator (Received Signal Strength Indicator, RSSI). When a communications system is a cellular communications system, the signal strength parameter may be a reference signal receiving power (Reference Signal Receiving Power, RSRP), reference signal received quality (Reference Signal Receiving Quality, RSRQ), or the like.

A plurality of communications systems detected by the mobile phone 100 at each location may be communications systems located within a preset distance range of the mobile phone; or a plurality of communications systems to which the mobile phone once connects; or all communications systems that can be detected by the mobile phone 100.

Still referring to FIG. 4, the mobile phone 100 detects three signal strength parameter sets. Each signal strength parameter set includes signal strengths of three communications systems. A signal strength parameter set 1 is used as an example. The signal strength parameter set 1 includes respective signal strength parameters of an AP 1, an AP 2, and a base station. An RSSI of the AP 1 is 80 db, an RSSI of the AP 2 is 70 db, an RSRP of the LTE is 85 db, and the signal strength parameter set 1 is (80 db, 70 db, 85 db). Table 5 shows an example of the signal strength parameter set 1. A QoS parameter may include one or more of a plurality of types of parameters such as a latency, jitter, a packet loss rate, and a throughput. In this embodiment, that the QoS parameter is a throughput is used as an example. Other cases are not described.

TABLE 5

| Communications system | Signal strength parameter | Signal strength value | QoS value |
|---|---|---|---|
| Wi-Fi AP 1 | RSSI | 80 db | 90 GB |
| Wi-Fi AP 2 | RSSI | 70 db | 70 GB |
| LTE | RSRP | 85 db | 30 GB |
| Signal strength parameter set 1 | (80 db, 70 db, and 85 db) | | |
| QoS parameter set 1 | (90 GB, 70 GB, and 30 GB) | | |

It can be learned from the foregoing content that the signal strength parameter and the QoS parameter are different. Therefore, Table 5 may further include the QoS parameter set 1 (a process in which the mobile phone 100 detects QoS parameters of the AP 1, the AP 2, and the LTE is described above, and details are not described again). The QoS parameter set 1 includes a QoS parameter of each communications system.

Similarly, the mobile phone may collect another signal strength parameter set, for example, a signal strength parameter set 2 and a signal strength parameter set 3. The signal strength parameter set 2 is used as an example. For example, Table 6 shows an example of the signal strength parameter set 2.

TABLE 6

| Communications system | Signal strength parameter | Signal strength value | QoS value |
|---|---|---|---|
| Wi-Fi AP 1 | RSSI | 70 db | 50 GB |
| Wi-Fi AP 2 | RSSI | 60 db | 20 GB |
| LTE | RSRP | 75 db | 60 GB |
| Signal strength parameter set 2 | (70 db, 60 db, and 75 db) | | |
| QoS parameter set 2 | (50 GB, 20 GB, and 60 GB) | | |

It can be learned from the foregoing description that the mobile phone 100 may store the signal strength parameter sets 1 to 3, and a QoS parameter set corresponding to each signal strength parameter set. Therefore, the mobile phone 100 does not need to detect a geographical location, but only needs to evaluate quality of a communications system based on a current signal strength parameter, and directly switches to a predetermined target system when determining that switching needs to be performed, so that time for switching between systems can be reduced, impact on a service can be reduced, and switching efficiency and device intelligence are improved. Specifically, Table 7 shows an example of a mapping relationship between a signal strength parameter set and a QoS parameter set.

TABLE 7

| Signal strength parameter set | Value of a signal strength parameter | QoS parameter set |
|---|---|---|
| Signal strength parameter set 1 | (80 db, 70 db, and 70 db) | (90 GB, 70 GB, and 30 GB) |
| Signal strength parameter set 2 | (70 db, 60 db, and 75 db) | (50 GB, 20 GB, and 60 GB) |
| Signal strength parameter set 3 | (90 db, 80 db, and 80 db) | (30 GB, 50 GB, and 60 GB) |

S502: The mobile phone 100 determines, based on a currently collected first signal strength parameter set, a second signal strength parameter set that matches the first signal strength parameter set.

In a process in which the user uses the mobile phone 100, for example, when the mobile phone 100 starts an application, the mobile phone 100 may collect the first signal strength parameter set. The mobile phone 100 performs matching in the signal strength parameter sets 1 to 3 in Table 7 based on the first signal strength parameter set, to determine a signal strength parameter set that matches the first signal strength parameter set. The following describes a process in which the mobile phone 100 matches the first signal parameter set with the stored signal strength parameter sets 1 to 3.

Still referring to FIG. 4, it is assumed that the first signal strength parameter set collected by the mobile phone 100 is a signal strength parameter set 4 (75 db, 70 db, and 80 db). The mobile phone 100 determines a signal strength parameter set in the stored signal strength parameter sets 1 to 3 that is at a shortest "distance" from the signal strength parameter set 4. The "distance" between two signal strength parameter sets herein may be understood as that a difference between two corresponding signal strengths in the two signal strength parameter sets is the smallest. Specifically, the mobile phone 100 may determine a first difference between a signal strength of the AP 1 in the signal strength parameter set 4 and a signal strength of the AP 1 in the signal strength parameter set 1, determine a second difference between a signal strength of the AP 2 in the signal strength parameter set 4 and a signal strength of the AP 2 in the signal strength parameter set 1, and determines a third difference between a signal strength of the LTE in the signal strength parameter set 4 and a signal strength of the LTE in the signal strength parameter set 1. The mobile phone 100 adds the first difference, the second difference, and the third difference to obtain a first sum, and the first sum is a "distance" between the signal strength parameter set 4 and the signal strength parameter set 1. Similarly, the mobile phone 100 may determine a "distance" between the signal strength parameter set 4 and the signal strength parameter set 2, and a "distance" between the signal strength parameter set 4 and the signal strength parameter set 3. The mobile phone 100 may determine the signal strength parameter set that is at the shortest "distance" from the signal strength parameter set 4.

S503: The mobile phone determines, based on the determined second signal strength parameter set, a QoS parameter set corresponding to the second signal strength parameter set.

It is assumed that the mobile phone 100 determines that the signal strength parameter set that is at the shortest "distance" from the signal strength parameter set 4 is the signal strength parameter set 1, namely, a second signal strength set. The mobile phone 100 may determine, according to Table 5, a QoS parameter set corresponding to the signal strength parameter set 1, namely, the QoS parameter set 1. The mobile phone 100 determines a proper communications system based on the QoS parameter set 1, and establishes a connection to the communications system.

In an example, it can be learned from the foregoing content that each communications system may have different QoS values in different time periods. Therefore, the mobile phone 100 may consider time information when collecting a QoS parameter of each communications system at each location. Still referring to FIG. 4, when detecting the QoS parameter of each communications system, the mobile phone 100 may further record the time information, namely, a time period in which the mobile phone 100 detects the QoS parameter of each communications system. For details, refer to Table 8. Table 8 shows a QoS parameter set of the signal strength parameter set 1 in different time periods.

TABLE 8

| Signal strength parameter set | Value of a signal strength parameter | Time information | QoS parameter set |
|---|---|---|---|
| Signal strength parameter set 1 | (80 db, 70 db, and 70 db) | 10:00-12:00 | (90 GB, 70 GB, and 30 GB) |
|  |  | 6:00-8:00 | (120 GB, 90 GB, and 50 GB) |
| Signal strength parameter set 2 | (70 db, 60 db, and 75 db) | 10:00-12:00 | (50 GB, 20 GB, and 60 GB) |
| Signal strength parameter set 3 | (90 db, 80 db, and 80 db) | 10:00-12:00 | (30 GB, 50 GB, and 60 GB) |

For example, still referring to FIG. 4, it is assumed that the first signal strength parameter set collected by the mobile phone 100 is the signal strength parameter set 4 (75 db, 70 db, and 80 db). The mobile phone 100 determines that the signal strength set 1 is at a shortest "distance" from the signal strength set 4, and determines that a current time is in a time period from 10:00 to 12:00. Therefore, the mobile phone 100 determines that the QoS parameter set is (90 GB, 70 GB, and 30 GB). The mobile phone 100 determines a communications system that has a largest QoS value, namely, a communications system whose QoS value is 90 GB, namely, the AP 1. The mobile phone 100 establishes a connection to the AP 1.

In another example, the user may manually select, based on a requirement of the user, to establish a connection to a communications system. The mobile phone 100 may record an operation performed by the user. Table 9 shows another mapping relationship between the signal strength parameter set 1 and a QoS parameter set in different time periods.

TABLE 9

| Signal strength parameter set | Value of a signal strength parameter | Selection of a user | Time information | QoS parameter set |
|---|---|---|---|---|
| Signal strength parameter set 1 | (80 db, 70 db, and 70 db) | AP 1 | 10:00-12:00 | (90 GB, 70 GB, and 30 GB) |
|  |  | AP 2 | 6:00-8:00 | (120 GB, 90 GB, and 50 GB) |
| Signal strength parameter set 2 | (70 db, 60 db, and 75 db) | AP 2 | 10:00-12:00 | (50 GB, 20 GB, and 60 GB) |
| Signal strength parameter set 3 | (90 db, 80 db, and 80 db) | LTE | 10:00-12:00 | (30 GB, 50 GB, and 60 GB) |

For example, still referring to FIG. 4, it is assumed that the first signal strength parameter set collected by the mobile phone 100 is the signal strength parameter set 4 (75 db, 70 db, and 80 db). The mobile phone 100 determines that the signal strength set 1 is at a shortest "distance" from the signal strength set 4, and determines that a current time is in a time period from 10:00 to 12:00. Therefore, the mobile phone 100 determines, based on the selection of the user, to establish a connection to the AP 1. Optionally, the mapping relationship may further include an application running in the mobile phone during collection, including a foreground application and/or a background application; may further include attributes of these applications, for example, a voice service, a video service, and a game service; or a latency-sensitive service, a packet loss rate-sensitive service, a throughput-sensitive service, or the like.

S504: The mobile phone 100 selects a proper communications system from the determined QoS parameter set according to a preset policy, and establishes a connection to the determined communications system.

Optionally, after determining the QoS parameter set, the mobile phone 100 may determine a communications system whose QoS parameter has a largest value in the QoS parameter set, and connect to the communications system; or the mobile phone 100 determines, based on a QoS requirement of a currently running application, a communications system that meets the QoS requirement in the QoS parameter set, and establishes a connection to the communications system; or the mobile phone 100 determines a proper communications system based on the selection of the user, and connects to the communications system; or the mobile phone 100 selects a communications system with lowest costs from a plurality of communications systems that meet a QoS requirement of a currently running application, and establishes a connection to the communications system. In actual application, the mobile phone 100 can select a proper communications system in one or more of the foregoing manners and another manner specified by the user.

In the foregoing embodiment, that the mobile phone 100 collects three signal strength parameter sets is used as an example. In actual application, signal strengths of each communications system collected by the mobile phone 100 at different locations are different. To be specific, the mobile phone 100 obtains different signal strength parameter sets at different locations. Therefore, the mobile phone 100 may store each signal strength parameter set, and then select a proper communications system in the method shown in FIG. 5. The following describes another embodiment. In this embodiment, when the mobile phone 100 collects a relatively large quantity of signal strength parameter sets, the mobile phone may classify the signal strength parameter sets, and select, as a quasi signal strength parameter set, one signal strength parameter set from a plurality of signal strength parameter sets classified into one type. The quasi signal strength parameter set reflects the plurality of signal strength sets classified into one type. That is, one type of signal strength parameter set corresponds to one quasi signal strength parameter set. The mobile phone does not need to store the plurality of signal strength parameter sets, and only needs to store the quasi signal strength parameter set. This helps save memory.

It should be noted that all or some steps (for example, S502 to S505) in the embodiment shown in FIG. 5 may be always performed. For example, S302 to S305 are always performed provided that the mobile phone 100 is in a power-on state.

Certainly, all or some steps (for example, S502 to S505) in the embodiment shown in FIG. 5 may alternatively be performed when a condition is met. For example, when detecting that the current location changes, the mobile phone 100 performs once all or some steps (for example, S502 to S505) shown in FIG. 5. For another example, when the mobile phone 100 detects that QoS of a currently connected communications system does not meet a current service requirement/user requirement, or current power consumption is relatively high (greater than preset power consumption), all or some steps (for example, S502 to S505) shown in FIG. 5 are performed. In this manner, frequent switching may be avoided, a calculation amount is reduced, and power consumption is reduced.

Figure 6:
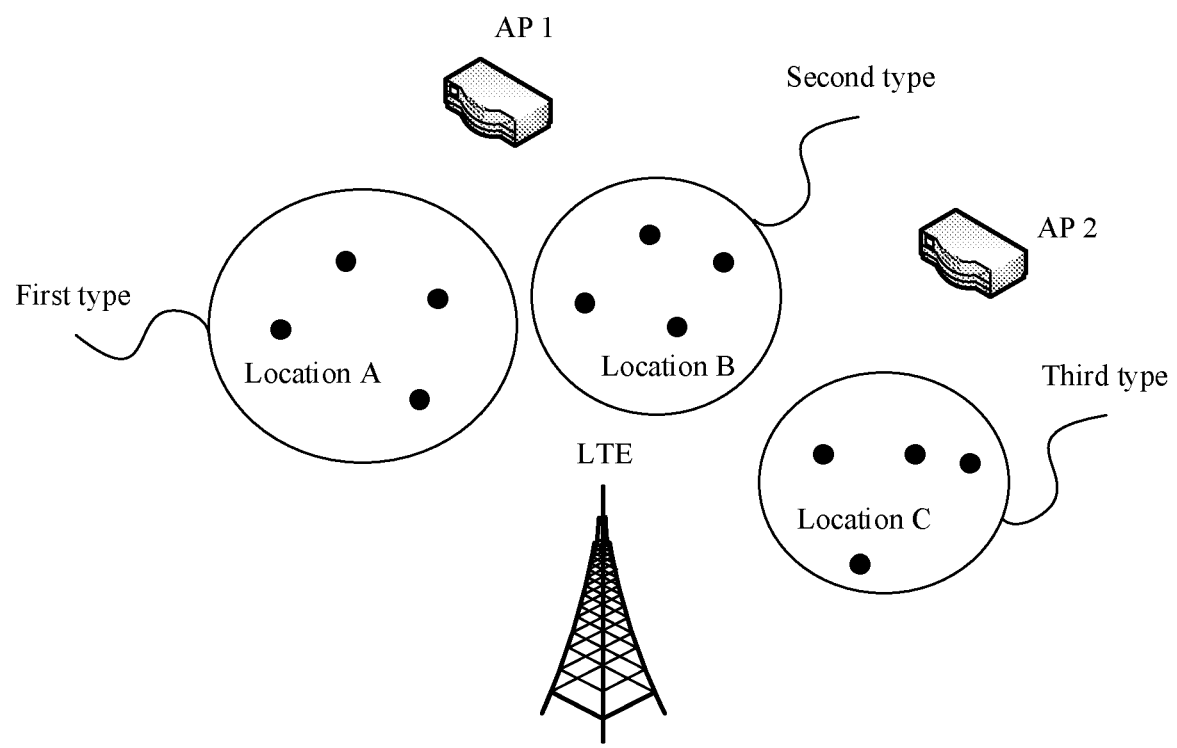
FIG. 6 is a schematic diagram of a process of classifying signal strength parameter sets according to an embodiment of the present invention.

FIG. 6 is a schematic diagram of an application scenario according to an embodiment of this application. As shown in FIG. 6, the mobile phone 100 collects 12 signal strength parameter sets (12 black dots in FIG. 6). The mobile phone 100 classifies the 12 signal strength parameter sets, to obtain three types of signal strength parameter sets. For example, the mobile phone 100 classifies the signal strength parameter sets 1 to 4 into a first type of signal strength parameter set, classifies the signal strength parameter sets 5 to 8 into a second type of signal strength parameter set, and classifies the signal strength parameter sets 9 to 12 into a third type of signal strength parameter set.

The following describes a process in which the mobile phone 100 classifies the 12 signal strength parameter sets.

For example, if the mobile phone 100 determines that a "distance" between any two signal strength parameter sets in the signal strength parameter sets 1 to 4 is less than a first preset distance, the mobile phone 100 classifies the signal strength parameter sets 1 to 4 into one type. If the mobile phone 100 determines that a "distance" between any two signal strength parameter sets in the signal strength parameter sets 5 to 8 is less than a second preset distance, the mobile phone 100 classifies the signal strength parameter sets 5 to 8 into one type. If the mobile phone 100 determines that a "distance" between any two signal strength parameter sets in the signal strength parameter sets 9 to 12 is less than a third preset distance, the mobile phone 100 classifies the signal strength parameter sets 9 to 12 into one type.

After classifying the signal strength parameter sets 1 to 4 into the first type of signal strength parameter set, the mobile phone 100 may select one signal strength parameter set from the signal strength parameter sets 1 to 4 to represent the first type of signal strength parameter set. The selected signal strength parameter set is referred to as a quasi signal strength parameter set 1. The mobile phone 100 only needs to store the quasi signal strength parameter set 1, and does not need to store the strength parameter sets 1 to 4, to save resources. For example, the mobile phone 100 may randomly select one signal strength parameter set from the signal strength parameter sets 1 to 4, or the mobile phone 100 obtains an average value of the signal strength parameter sets 1 to 4, to obtain a signal strength parameter set. Similarly, the mobile phone 100 may determine a quasi signal strength parameter set 2 that represents the second type of signal strength parameter set, and determine a quasi signal strength parameter set 3 that represents the third type of signal strength parameter set. The mobile phone 100 stores the determined three types of signal strength parameter sets for use. A subsequent process in which the mobile phone 100 uses the three types of signal strength parameter sets is similar to the foregoing process. Details are not described again.

Figure 7:
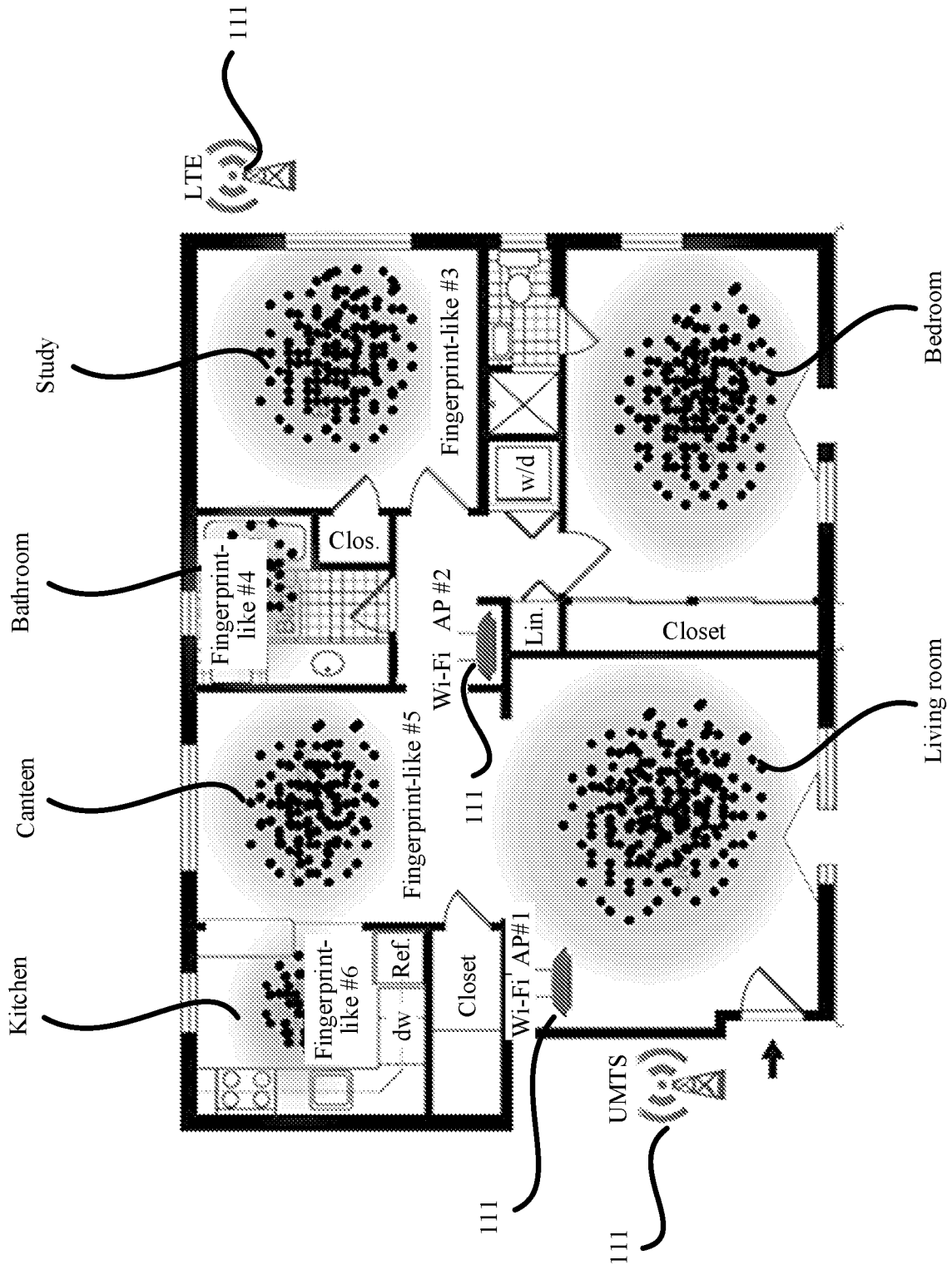
FIG. 7 is a schematic diagram of a process of classifying signal strength parameter sets according to an embodiment of the present invention.

For example, referring to FIG. 7, an indoor floor plan of a house is used as an example. Four wireless communications systems are disposed in the house. The four wireless communications systems are respectively a Wi-Fi AP 1, a Wi-Fi AP 2, LTE, and a UMTS. The four wireless communications systems are respectively located at different locations in the house.

The mobile phone 100 may collect a signal strength parameter of each of the four communications systems at each location, to obtain a signal strength parameter set, and further obtain a plurality of signal strength parameter sets. Each location corresponds to one signal strength parameter set, for example, a black dot in FIG. 7. Because a relatively large quantity of signal strength parameter sets, namely, black dots are obtained, the mobile phone 100 may classify the plurality of signal strength parameter sets.

Specifically, it is assumed that the mobile phone 100 collects a total of 1000 signal strength parameter sets indoors, namely, 1000 black dots. The mobile phone 100 classifies the 1000 signal strength parameter sets. A specific process is as follows: The mobile phone 100 determines, from the 1000 signal strength parameter sets, that a "distance" between 300 signal strength parameter sets is less than a preset distance, and the mobile phone 100 classifies the 300 signal strength parameter sets as a first type of signal strength parameter set. The mobile phone 100 selects one signal strength parameter set from the 300 signal strength parameter sets to represent the first type of signal strength parameter set. The selected signal strength parameter set is referred to as a quasi signal strength parameter set 1. The first type of signal strength parameter set is a plurality of signal strength parameter sets detected by the mobile phone 100 in a living room.

Similarly, the mobile phone 100 determines a "distance" between 200 signal strength parameter sets in the 1000 signal strength parameter sets. The mobile phone 100 classifies the 200 signal strength parameter sets into a second type of signal strength parameter set, and selects one signal strength parameter set from the 2000 signal strength parameter sets to represent the second type of signal strength parameter set. The selected signal strength parameter set is referred to as a quasi signal strength parameter set 2. The second type of signal strength parameter set is a plurality of signal strength parameter sets detected by the mobile phone 100 in a bedroom. A process of classifying another type of signal strength parameter set is similar, and details are not described again.

As shown in FIG. 7, the mobile phone 100 obtains five types of signal strength parameter sets, each type of signal strength parameter set corresponds to one type of signal strength parameter set, and each type of signal strength parameter set corresponds to one QoS parameter set.

The following continues to use FIG. 7 as an example to describe a communications systems switching process of the mobile phone 100.

It is assumed that a user operates the mobile phone 100 in the living room. The mobile phone 100 collects a first signal strength parameter set. The mobile phone 100 determines a type of signal strength parameter set, in the five types, to which the first signal strength parameter set belongs. Specifically, the mobile phone 100 may determine a type of signal strength parameter set from which the first signal strength parameter set is at a "distance" less than the preset distance. If a "distance" between the first signal strength parameter set and the quasi signal strength parameter set 1 is less than the preset distance, the mobile phone 100 determines that the first signal strength parameter set belongs to the first type of signal strength parameter set. The mobile phone 100 determines, based on the quasi signal strength parameter set 1, a QoS parameter set 1 corresponding to the quasi signal strength parameter set 1. Assuming that the QoS parameter set 1 determined by the mobile phone 100 indicates that a QoS parameter of the AP 1 has a largest value, the mobile phone 100 establishes a connection to the AP 1; or the mobile phone 100 determines that a currently running application is WeChat, determines a QoS requirement of WeChat according to Table 3, determines, based on the QoS parameter set 1, a communications system whose QoS value is greater than the QoS requirement of WeChat, and establishes a connection to the communications system.

When the user carries the mobile phone 100 and moves from the living room to the bedroom, the mobile phone 100 detects that a current location changes, and the mobile phone 100 may collect a second signal strength parameter set. The mobile phone 100 determines a type of signal strength parameter set, in the five types, to which the second signal strength parameter set belongs. If the mobile phone 100 determines that the second signal strength parameter set belongs to the second type of signal strength parameter set, the mobile phone 100 determines, based on a quasi signal strength parameter set 2 of the second type of signal strength parameter set, a QoS parameter set 2 corresponding to the quasi signal strength parameter set 2. The mobile phone 100 determines a communications system based on the QoS parameter set 2, and establishes a connection to the communications system.

In the foregoing example, after collecting the first signal strength parameter set, the mobile phone 100 collects the second signal strength parameter set when detecting that the current location changes. Alternatively, after collecting the first signal strength parameter set, the mobile phone 100 may collect the second signal strength parameter set after preset duration. Alternatively, after collecting the first signal strength parameter set, the mobile phone 100 collects the second signal strength parameter set under active triggering of the user. Alternatively, after the mobile phone 100 collects the first signal strength parameter set, if a currently running application is switched from a first application to a second application, the mobile phone 100 collects the second signal strength parameter set.

It should be noted that, it can be learned from the foregoing content, that a QoS parameter of a communications system may change with time and an access point, and a signal strength parameter of the communications system may also change with time and a geographical location (for example, a location of an AP changes) of the communications system. Therefore, the mobile phone 100 may update a mapping relationship between a signal strength parameter set and a QoS parameter set. The mobile phone 100 may update only a signal strength parameter in the mapping relationship between a signal strength parameter set and a QoS parameter set, or may update only the QoS parameter set.

It should be noted that there is a relatively small quantity of power consumption overheads when a signal strength parameter is collected, and there is a relatively large quantity of power consumption overheads when a QoS parameter is detected. Therefore, the mobile phone 100 may specify that an update period of the signal strength parameter is different from an update period of the QoS parameter set. For example, the update period of the strength parameter is set to be relatively short, and the update period of the QoS parameter set is set to be relatively long. The following describes a process in which the mobile phone 100 updates the QoS parameter set in the mapping relationship between a signal strength parameter set and a QoS parameter set.

Figure 8:
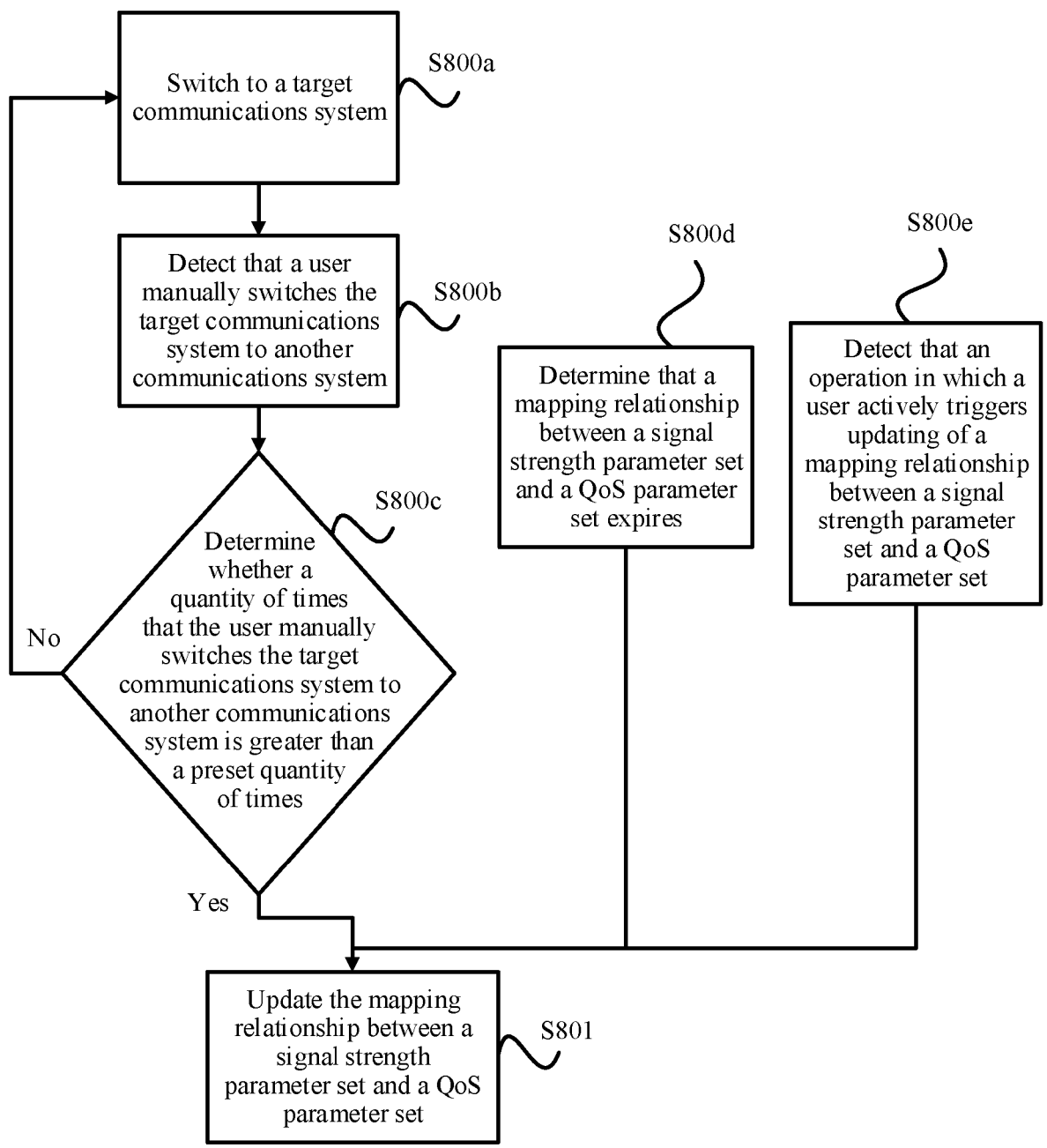
FIG. 8 is a schematic flowchart of updating a mapping relationship between a signal strength parameter and a QoS parameter set according to an embodiment of the present invention.

FIG. 8 is a schematic flowchart of updating a mapping relationship between a signal strength parameter and a QoS parameter set according to an embodiment of this application. As shown in FIG. 8, a procedure of the method includes the following steps.

S801: The mobile phone 100 updates the mapping relationship between a signal strength parameter set and a QoS parameter set.

In this embodiment of this application, the mobile phone 100 may trigger, for a plurality of triggering reasons, updating of the mapping relationship between a signal strength parameter set and a QoS parameter set. Manner 1: A user actively triggers updating. Manner 2: The mobile phone 100 periodically performs automatic updating. Manner 3: When a QoS parameter set determined by the mobile phone 100 based on an original mapping relationship between a signal strength parameter set and a QoS parameter set is inaccurate, the mobile phone 100 updates the mapping relationship between a signal strength parameter set and a QoS parameter set.

Manner 3 is used as an example. Before S801, the procedure of the method further includes the following steps.

S800*a*: The mobile phone 100 switches to a target communications system.

After the mobile phone 100 determines a proper communications system according to the foregoing procedure shown in FIG. 3 or FIG. 5, the mobile phone 100 connects to the communications system. The communications system is the target communications system. It can be learned from the foregoing content that a value of a QoS parameter of a communications system may be affected by an access amount or another factor. Therefore, after the mobile phone 100 connects to the target communications system, a value of a QoS parameter of the target communications system may not meet a requirement. Therefore, after switching to the target communications system, the mobile phone 100 may detect the QoS parameter of the target communications system. If the mobile phone 100 detects that the value of the QoS parameter of the target communications system is less than a stored value of the QoS parameter of the target communications system, the mobile phone 100 may trigger updating of the mapping relationship between a signal strength parameter set and a QoS parameter set.

S800*b*: The mobile phone 100 detects that the user manually switches the target communications system to another communications system.

It can be learned from the foregoing content that after the mobile phone 100 switches to the target communications system, the value of the QoS parameter of the target communications system may not meet a requirement. For example, the mobile phone 100 detects that the value of the QoS parameter of the target communications system is less than the stored value of the QoS parameter of the target communications system, and consequently, frame freezing or a latency occurs when the mobile phone 100 runs a service. In this case, the user may also manually switch to another communications system.

The mobile phone 100 may count a quantity of times that the user manually switches the target communications system to another communications system after the mobile phone 100 switches to the target communications system. If the quantity of times is relatively large, it indicates that the mobile phone 100 stores an inaccurate value of the QoS parameter of the target communications system, and the mobile phone 100 may update the mapping relationship between a signal strength parameter set and a QoS parameter set.

S800*c*: The mobile phone 100 determines whether a quantity of times that the user manually switches the target communications system to another communications system is greater than a preset quantity of times, and if the quantity of times is greater than the preset quantity of times, performs S801; or if the quantity of times is not greater than the preset quantity of times, performs S800*a*.

Manner 2 is used as an example. Before S801, the procedure of the method further includes:

S800*d*: The mobile phone 100 determines that a quasi signal strength parameter set expires.

For example, when establishing the mapping relationship between a signal strength parameter set and a QoS parameter set, the mobile phone 100 may set a validity period for each QoS parameter set in the mapping relationship. Table 5 is used as an example, and the mobile phone 100 may set a validity period of a QoS parameter set 1 to 24 hours. When the mobile phone 100 detects that the validity period of the QoS parameter set 1 expires, the mobile phone 100 updates the mapping relationship between a signal strength parameter set and a QoS parameter set. Certainly, the mobile phone 100 may update only the QoS parameter set 1, or may update all QoS parameter sets.

Manner 3 is used as an example. Before S801, the procedure of the method further includes:

S800*e*: The mobile phone 100 detects an operation in which the user actively triggers updating of the mapping relationship between a signal strength parameter set and a QoS parameter set.

For example, a switch control may be disposed in the mobile phone 100. When the switch control is triggered, the mobile phone 100 updates the mapping relationship between a signal strength parameter set and a QoS parameter set. The switch control may be disposed in an app (for example, a setting app).

It should be noted that different settings of a communications parameter of the mobile phone 100 affect a detected value of the QoS parameter. (For example, when detecting a QoS parameter of a communications system, the mobile phone 100 reports the communications parameter of the mobile phone 100 to the communications system, and the communications system feeds back a packet to the mobile phone 100 based on the communications parameter. The packet is used to indicate a QoS parameter of a link between the mobile phone 100 and the communications system). The communications parameter may be a configuration parameter of an antenna (for example, the antenna 2 in FIG. 1) in the mobile phone 100. For example, whether the antenna 2 of the mobile phone 100 is in a single-input single-output (single-input single-output, SISO) mode or a multiple-input multiple-output (multiple-input multiple-output, MIMO) mode. Alternatively, the mobile phone 100 currently supports a quantity of carriers (component carrier, CC). However, a setting of the communications parameter of the mobile phone 100 determines power consumption of the mobile phone 100.

In this embodiment of this application, after determining a proper communications system, the mobile phone 100 establishes a connection to the communications system. The mobile phone 100 may reduce power consumption of the mobile phone 100 as much as possible based on a value of a QoS parameter that meets a current requirement.

In an example, the mobile phone 100 may set a plurality of power consumption levels, and each level corresponds to different communications parameter configurations, power consumption overheads, and values of the QoS parameter. For example, Table 10 shows an example of a mapping relationship between a power consumption level and a communications parameter according to an embodiment of this application.

TABLE 9

| Power consumption level | MIMO con-figuration | CA con-figuration | Power con-sumption | Value of a QoS parameter |
|---|---|---|---|---|
| 0 | SISO | 1 CC | 1000 w | 30 GB |
| 1 | 2 × 2 MIMO | 1 CC | 1010 w | 40 GB |
| 2 | 4 × 4 MIMO | 1 CC | 1020 w | 50 GB |
| 3 | SISO | 2 CCs | 1030 w | 80 GB |
| 4 | 2 × 2 MIMO | 2 CCs | 1040 w | 90 GB |
| 5 | 4 × 4 MIMO | 2 CCs | 1050 w | 100 GB |

For example, the mobile phone 100 is currently running iQIYI, and determines, according to Table 4, that a QoS requirement of iQIYI is 80 GB. It is assumed that the mobile phone is currently located at a location A, and the mobile phone determines, according to Table 1, that a QoS parameter set corresponding to the location A is a QoS parameter set 1. The mobile phone 100 determines a communications system, namely, the AP 1, whose QoS parameter has a value greater than 80 GB in the QoS parameter set 1. To reduce power consumption of the mobile phone 100 as much as possible, the mobile phone 100 may set a power consumption level that can ensure that the value of the QoS parameter is 80 GB, namely, a level 3. In this case, the mobile phone 100 configures the antenna to be in the SISO mode, and configures the CA configuration to be 2 CCs.

For another example, after the mobile phone 100 determines a communications system based on a currently running application, the mobile phone 100 may detect whether the application runs in the background. If the application runs in the background (for example, the mobile phone 100 is in a lock interface state, but a background download task is performed), the mobile phone 100 may use a low power consumption level. If the application runs in the foreground, the mobile phone 100 uses a lowest power consumption level whose QoS parameter has a value not less than a requirement of the application. For example, when iQIYI runs in the background, the mobile phone 100 may adjust the power consumption level to a level 1. When the iQIYI runs in the foreground, the mobile phone 100 may adjust the power consumption level to the level 3 (the QoS requirement of the iQIYI is 80 GB).

For example, Table 10 may be obtained by the mobile phone 100 through self-learning, may be user-defined, or may be determined by a designer based on experience. Table 10 may be automatically updated periodically, or may be updated when the user actively triggers updating.

It can be learned from the foregoing content that the mobile phone 100 may update the mapping relationship between a signal strength parameter set and a QoS parameter set. To accurately detect the value of the QoS parameter of each communications system as much as possible, the mobile phone 100 may set a highest level or a relatively high level when updating the mapping relationship between a signal strength parameter set and a QoS parameter set, to ensure accuracy of detecting the QoS parameter.

Implementations of this application may be randomly combined to achieve different technical effects.

In the foregoing embodiments provided in this application, the methods provided in the embodiments of this application are described from a perspective in which a client serves as an execution body. To implement functions in the methods provided in the embodiments of this application, the client may include a hardware structure and/or a software module, and implement the functions in a form of the hardware structure, the software module, or a combination of the hardware structure and the software module. Whether a function in the functions is performed by using the hardware structure, the software module, or the combination of the hardware structure and the software module depends on a specific application and a design constraint condition of the technical solution.

It should be noted that a communications system switching function (for example, all or some steps in FIG. 3 such as only S302 to S304, or all or some steps in FIG. 5 such as only S502 to S504) provided in the embodiments of this application may be always started when the mobile phone 100 is powered on, or may be started only when the user actively triggers the function.

Figure 9A:
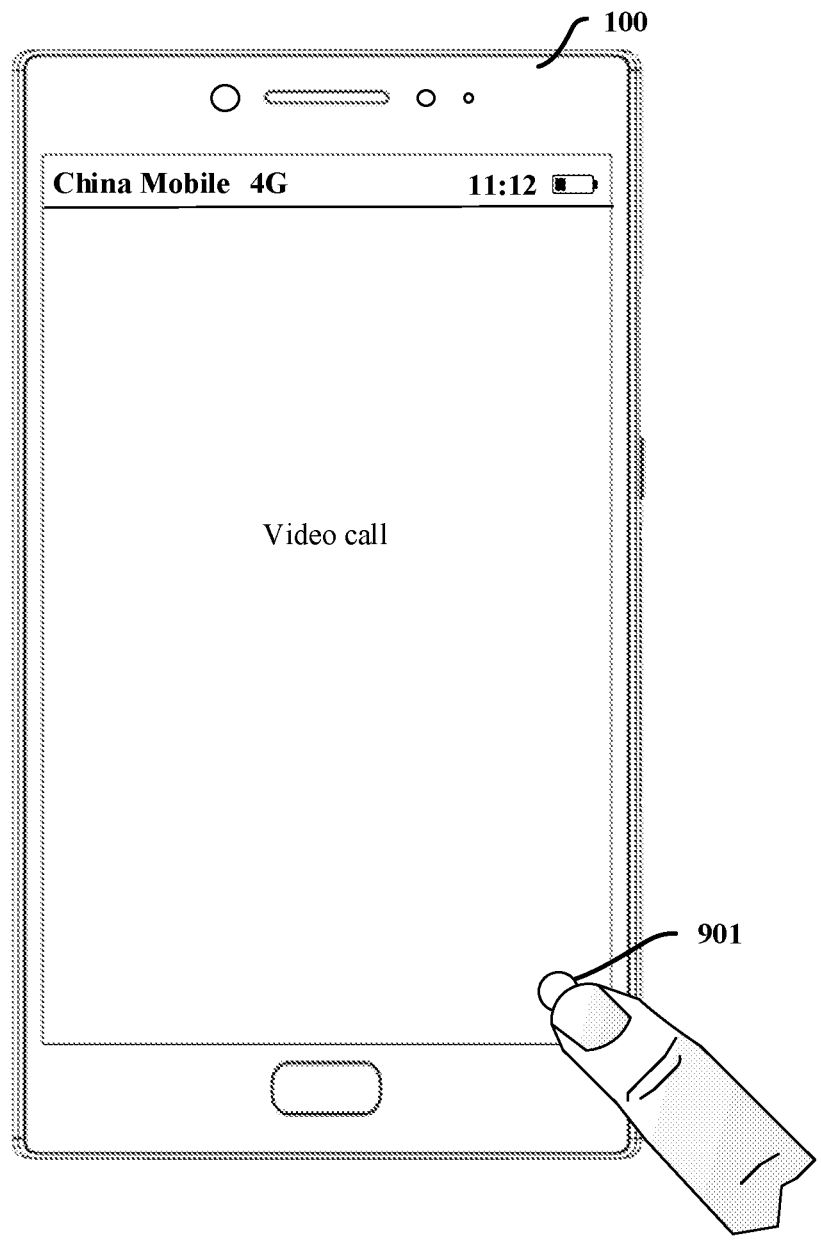
FIG. 9($a$) and FIG. 9($b$) are a schematic diagram of a display interface of a mobile phone according to an embodiment of the present invention.

In an example, referring to FIG. 9(a), the mobile phone 100 is currently in a video call, and an icon 901 is disposed in a video call interface. When the icon 901 is triggered, the mobile phone 100 performs the solution shown in FIG. 3 or FIG. 5 (for example, the mobile phone 100 may perform all steps in FIG. 2 or FIG. 5; for another example, when the mobile phone 100 has obtained a correspondence between a geographical location and a QoS parameter set before a current time, the mobile phone may perform only S302 to S304 in FIG. 3; or when the mobile phone 100 has obtained a correspondence between a signal strength set and a QoS parameter set before a current time, the mobile phone may perform only S502 to S504 in FIG. 5), to determine a QoS value that meets a current service requirement, and the mobile phone 100 switches to a communications system corresponding to the QoS value.

Optionally, after switching to another communications system, the mobile phone 100 may output a prompt, to prompt the user that the mobile phone 100 has switched to an optimal communications system. For example, still referring to FIG. 9(b), after detecting that the icon 901 is triggered, the mobile phone 100 displays prompt information 902. The prompt information 902 prompts the user with a fact that the mobile phone has switched to HUAWEI-53C0.

In this manner, when the user uses the icon 901 on a lock interface for the first time, the prompt information 902 may be used to help the user learn a function of the icon 901, to reduce a learning burden of the user on the mobile phone 100, and facilitate a user operation.

Figure 9B:
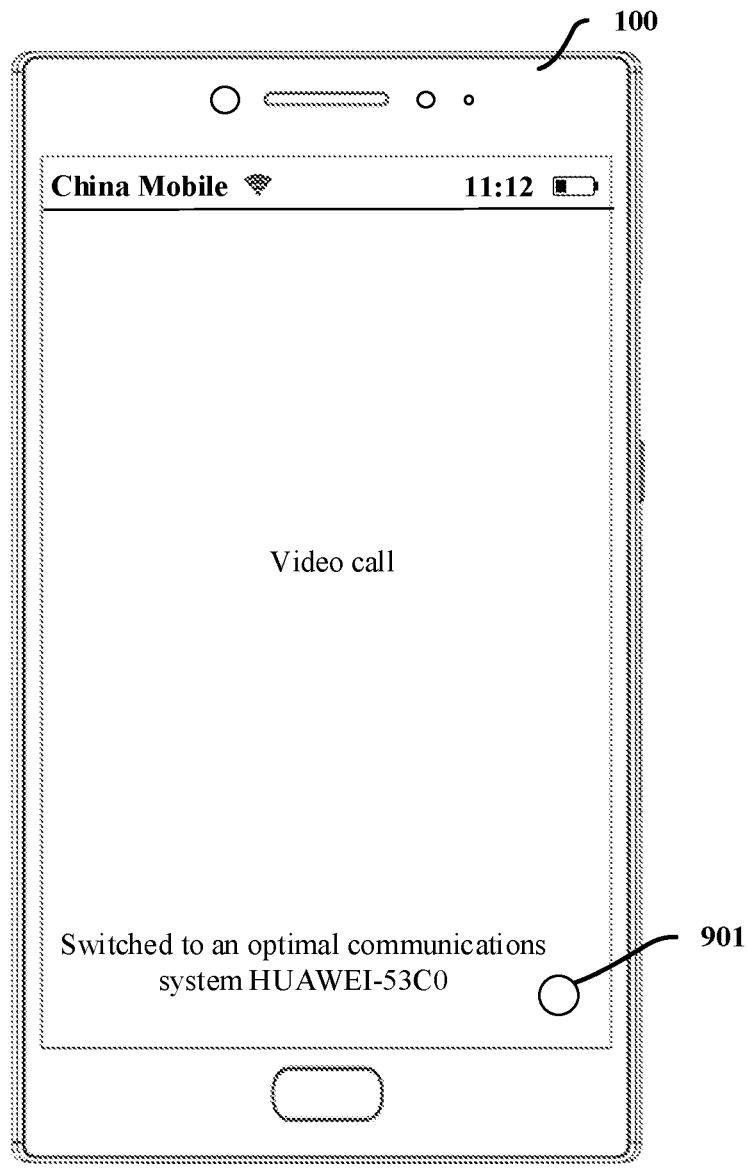

In FIG. 9(a) and FIG. 9(b), that a portal (an icon) is disposed on the video call interface of the mobile phone 100 is used as an example. Actually, a portal may also be disposed on an unlock interface of the mobile phone 100 or on another interface (for example, a home screen or a movie playing interface). For example, the mobile phone 100 displays the home screen, and an icon (which may be displayed in a form of an icon, or may be displayed in a form of a floating ball or in another form) is added to the home screen.

Figure 10:
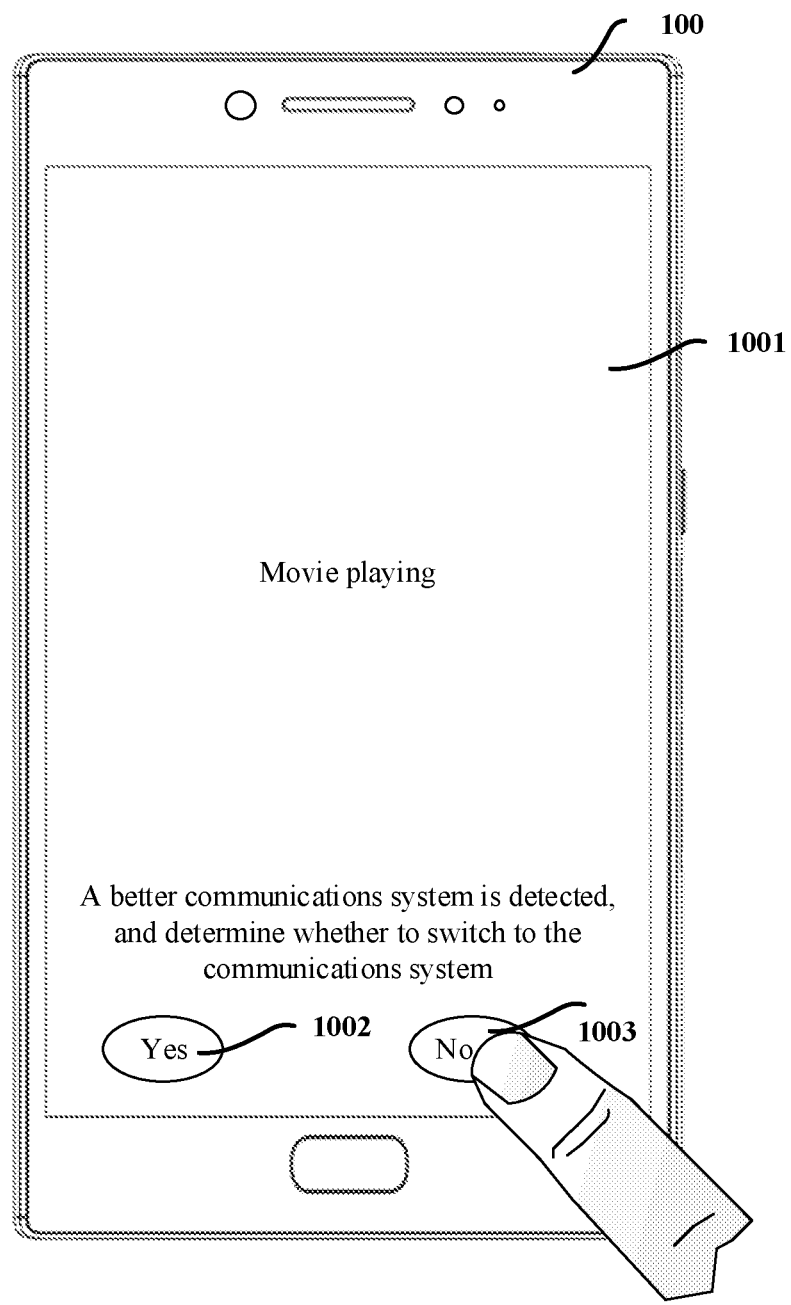
FIG. 10 is a schematic diagram of a display interface of a mobile phone according to an embodiment of the present invention.

In another example, referring to FIG. 10, the mobile phone 100 displays a movie playing interface 1001, and displays prompt information on the interface 1001, to be specific, "A better communications system is detected, and determine whether to break a current connection and switch to a communications system XX" or "Current network quality is poor, and determine whether to switch to a network XX" If the user selects "Yes" 1002, the mobile phone 100 disconnects from a currently connected communications system, and switches to a better communications system. If the user selects "No" 1003, the mobile phone 100 does not switch a system, and keeps a connection to a current communications system.

In this manner, the user may decide whether to switch the communications system. For example, the mobile phone 100 currently connects to Wi-Fi, and the mobile phone 100 plays a movie. If the Wi-Fi has a relatively large access amount, frame freezing occurs when the mobile phone 100 plays a movie, and the mobile phone 100 prompts the user whether to switch to a 4G network. To save costs, the user may select "No", that is, the mobile phone 100 continues to connect to the Wi-Fi.

An embodiment of the present invention further provides a terminal device, including a processor and a memory. The memory is configured to store one or more computer programs. When the one or more computer programs stored in the memory are executed by the processor, the terminal can perform all or some of the steps performed by the terminal that are described in the method embodiments shown in FIG. 3, FIG. 5, and FIG. 8.

An embodiment of the present invention further provides a computer storage medium. The storage medium may include a memory. The memory may store a program. When the program is executed, a terminal performs all or some of the steps performed by the terminal that are described in the method embodiments shown in FIG. 3, FIG. 5, and FIG. 8.

An embodiment of the present invention further provides a computer program product. When the computer program product runs on a terminal, the terminal is enabled to perform all or some of the steps performed by the terminal that are described in the method embodiments shown in FIG. 3, FIG. 5, and FIG. 8.

With descriptions of the foregoing implementations, a person skilled in the art may clearly understand that the embodiments of this application may be implemented by hardware, firmware or a combination thereof. When this application is implemented by software, the foregoing functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a computer. This is used as an example but is not limited to: The computer readable medium may include a RAM, a ROM, an electrically erasable programmable read-only memory (electrically erasable programmable read only memory, EEPROM), a compact disc read-only memory (compact disc read-Only memory, CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer readable medium. For example, if software is transmitted from a website, a server, or another remote source by using a coaxial cable, an optical fiber/cable, a twisted pair, a digital subscriber line (digital subscriber line, DSL) or wireless technologies such as infrared ray, radio, and microwave, the coaxial cable, optical fiber/cable, twisted pair, DSL, or wireless technologies such as infrared ray, radio, and microwave are included in fixation of a medium to which they belong. A disk (disk) and a disc (disc) used in the embodiments of this application includes a compact disc (compact disc, CD), a laser disc, an optical disc, a digital video disc (digital video disc, DVD), a floppy disc, and a Blu-ray disc. The disk usually copies data magnetically, and the disc copies data optically by using a laser. The foregoing combination should also be included in the protection scope of the computer readable medium.

In conclusion, the foregoing descriptions are merely embodiments of this application, but are not intended to limit the protection scope of this application. Any modifications, equivalent replacement, and improvement made according to the disclosure of this application shall fall within the protection scope of this application.

What is claimed is:

1. A method comprising:
obtaining a Quality of Service (QOS) parameter set for each of a plurality of geographic locations;
establishing a first connection to a first communications system, wherein the first communications system comprises a first QoS value;
running a first application comprising a QOS requirement;
obtaining a current geographical location;
obtaining a first QoS parameter set for a first geographic location that is closest to the current geographical location;
obtaining, from the first QoS parameter set, a second QoS value of a second communications system at the first geographic location;
selecting, based on a comparison of the first QOS value and the second QoS value, the second communications system;
confirming that the second QoS value meets the QOS requirement; and
disconnecting from the first communications system and establishing a second connection to the second communications system when the second QoS value meets the QoS requirement.

2. The method of claim 1, wherein before confirming that the second QOS value meets the QOS requirement, the method further comprises confirming that a preset condition is met, and wherein the preset condition comprises one or more of the following conditions:
the first QoS value of the first communications system does not meet a requirement of the first application;
the first QoS value does not meet a user requirement; or
current power consumption is greater than a preset power consumption.

3. The method of claim 1, wherein before confirming that the second QOS value meets the QOS requirement, the method further comprises confirming that the second QOS value is superior to the first QoS value, and wherein the second QoS value is superior to the first QoS value when the second QoS value is less than the first QOS value and when the QoS requirement comprises a latency or a packet loss rate.

4. The method of claim 1, wherein selecting the second communications system further comprises:
selecting the second communications system when the second QoS value is less than the first QOS value and when the QOS requirement comprises a latency or a packet loss rate; or
selecting the second communications system when the second QOS value is greater than the first QoS value and when the QoS requirement comprises a throughput.

5. The method of claim 1, wherein before disconnecting from the first communications system, the method further comprises:
outputting first prompt information, wherein the first prompt information prompts a user to switch to the second connection; and
receiving an indication of user assent to the switch.

6. The method of claim 1, further comprising:
confirming whether the second communications system meets a user habit, and when the second communications system meets the user habit, confirming whether the second QoS value meets the QOS requirement; or
confirming whether use duration of the first application is greater than preset duration, and when the use duration is greater than the preset duration, confirming whether the second QOS value meets the QOS requirement.

7. The method of claim 1, further comprising:
obtaining a correspondence between a first signal strength set and the first QoS parameter set, wherein the first QoS parameter set comprises a third QoS value of the second communications system, wherein the first signal strength set comprises a first signal strength of the second communications system, and wherein the third QoS value is in a one-to-one correspondence with a second signal strength in the first signal strength set;
detecting a current signal strength of the second communications system to obtain a second signal strength set;
obtaining, based on the correspondence between the second signal strength set and the first QOS parameter set, a second QoS parameter set corresponding to the second signal strength set; and
selecting the second QoS value from the second QoS parameter set.

8. The method of claim 1, wherein after establishing the second connection, the method further comprises displaying second prompt information, and wherein the second prompt information indicates that the second communications system has been accessed.

9. The method of claim 1 further comprising confirming, based on the QOS requirement, whether the second QoS value meets the QoS requirement in response to a preset operation from a user.

10. The method of claim 1, wherein before establishing the second connection, the method further comprises:
obtaining, based on a correspondence between a power consumption level and the first QoS value, at least one power consumption level comprising a third QoS value that falls between the QoS requirement and the second QOS value; and
connecting to the second communications system based on a control parameter corresponding to a first power consumption level in the at least one power consumption level, wherein the first power consumption level is a lowest power consumption level in the at least one power consumption level.

11. The method of claim 1, wherein the QoS requirement comprises at least one of a latency, jitter, a packet loss rate, or a throughput.

12. The method of claim 1, wherein selecting the second QoS value further comprises:
obtaining, from the first QoS parameter set, a second QoS parameter set that is closest to a current time; and
selecting the second QoS value based on the second QoS parameter set and the first QoS parameter set.

13. A device, comprising:
one or more processors; and
a memory coupled to the one or more processors and configured to store instructions that, when executed by the one or more processors, cause the device to be configured to:
obtain a Quality of Service (QOS) parameter set for each of a plurality of geographic locations;
establish a connection to a first communications system, wherein the first communications system comprises a first QoS value;
run a first application comprising a QOS requirement;
obtain a current geographical location;
obtain a first QoS parameter set for a first geographic location that is closest to the current geographical location;
obtain, from the first QoS parameter set, a second QOS value of a second communications system at the first geographic location;
select, based on a comparison of the first QOS value and the second QoS value, the second communications system;
confirm that the second QoS value meets the QOS requirement; and
disconnect from the first communications system and establish a connection to the second communications system when the second QOS value meets the QoS requirement.

14. The device of claim 13, wherein before the device is configured to confirm that the second QoS value meets the QOS requirement, the instructions further cause the device to be configured to:
detect that a preset condition is met, wherein the preset condition comprises one or more of the following conditions:
the first QoS value of the first communications system does not meet a requirement of the first application;
the first QoS value does not meet a user requirement; or
current power consumption of the device is greater than a preset power consumption.

15. The device of claim 13, wherein before the device is configured to confirm that the second QoS value meets the QoS requirement, the instructions further cause the device to confirm that the second QoS value is superior to the first QOS value.

16. The device of claim 15, wherein when the device is configured to select the second communications system, and the instructions further cause the device to perform one of:
select the second QoS value when the second QoS value is less than the first QoS value and when the QoS requirement comprises a latency or a packet loss rate; or
select the second QoS value when the second QoS value is greater than the first QOS value and wherein the QoS requirement comprises a throughput.

17. The device of claim 13, wherein before disconnecting from the first communications system, the instructions further cause the device to be configured to:
output first prompt information, wherein the first prompt information prompts a user to switch to the second connection; and
receive an indication of user assent to the switch.

18. A computer program product comprising computer-executable instructions stored on a non-transitory computer-readable medium that, when executed by one or more processors, cause a device to:
obtain a Quality of Service (QOS) parameter set for each of a plurality of geographic locations;
establish a connection to a first communications system, wherein the first communications system comprises a first QoS value;
run a first application comprising a QOS requirement;
obtain a current geographical location;

obtain a first QoS parameter set for a first geographic location that is closest to the current geographical location;

obtain, from the first QoS parameter set, a second QoS value of a second communications system at the first geographic location;

select, based on a comparison of the first QOS value and the second QoS value, the second communications system;

confirm that the second QoS value meets the QOS requirement; and disconnect from the first communications system and establish a connection to the second communications system when the second QoS value meets the QoS requirement.

19. The computer program product of claim 18, wherein before the device is configured to confirm whether the second QoS value meets the QoS requirement, the instructions further cause the device to:

detect that a preset condition is met, wherein the preset condition comprises one or more of the following conditions:

the first QoS value of the first communications system does not meet a requirement;

the first QoS value does not meet a user requirement; or current power consumption of the device is greater than a preset power consumption.

20. The computer program product of claim 18, wherein before the device is configured to confirm that the second QOS value meets the QOS requirement, the instructions further cause the device to detect that the second QoS value is superior to the first QoS value, and wherein the second QOS value is superior to the first QoS value when the second QoS value is greater than the first QOS value and when the QoS requirement comprises a throughput.

* * * * *

UNITED STATES PATENT AND TRADEMARK OFFICE
CERTIFICATE OF CORRECTION

PATENT NO. : 12,185,091 B2
APPLICATION NO. : 17/285636
DATED : December 31, 2024
INVENTOR(S) : Shu et al.

Page 1 of 3

It is certified that error appears in the above-identified patent and that said Letters Patent is hereby corrected as shown below:

On the Title Page

Page 2, Line 5, under item (56) Cited References, Foreign Patent Documents: "IN 101080089 A 11/2007" should read "CN 101080089 A 11/2007"

In the Claims

Claim 1, Column 36, Line 12: "Quality of Service (QOS) parameter" should read "Quality of Service (QoS) parameter"

Claim 1, Column 36, Line 17: "comprising (QOS) requirement;" should read "comprising QoS requirement;"

Claim 1, Column 36, Line 25: "of the first QOS value" should read "of the first QoS value"

Claim 1, Column 36, Line 28: "value meets the QOS" should read "value meets the QoS"

Claim 2, Column 36, Line 35: "second QOS value meets the QOS requirement" should read "second QoS value meets the QoS requirement"

Claim 3, Column 36, Line 45: "second QOS value meets the QOS requirement" should read "second QoS value meets the QoS requirement"

Claim 3, Column 36, Line 46: "second QOS" should read "second QoS"

Claim 3, Column 36, Line 49: "first QOS value" should read "first QoS value"

Claim 4, Column 36, Line 55: "first QOS value" should read "first QoS value"

Claim 4, Column 36, Line 56: "the QOS requirement" should read "the QoS requirement"

Signed and Sealed this
Eleventh Day of March, 2025

Coke Morgan Stewart
*Acting Director of the United States Patent and Trademark Office*

CERTIFICATE OF CORRECTION (continued)
U.S. Pat. No. 12,185,091 B2

Claim 4, Column 36, Line 59: "second QOS value" should read "second QoS value"

Claim 6, Column 37, Line 5: "the QOS requirement" should read "the QoS requirement"

Claim 6, Column 37, Line 9: "second QOS value meets the QOS requirement" should read "second QoS value meets the QoS requirement"

Claim 7, Column 37, Line 23: "the first QOS parameter" should read "the first QoS parameter"

Claim 9, Column 37, Line 35: "the QOS requirement" should read "the QoS requirement"

Claim 10, Column 37, Line 44: "QOS value" should read "QoS value"

Claim 13, Column 37, Line 66: "Quality of Service (QOS) parameter" should read "Quality of Service (QoS) parameter"

Claim 13, Column 38, Line 4: "comprising a QOS requirement" should read "comprising a QoS requirement"

Claim 13, Column 38, Line 9: "second QOS" should read "second QoS"

Claim 13, Column 38, Line 12: "first QOS value" should read "first QoS value"

Claim 13, Column 38, Line 15: "meets the QOS" should read "meets the QoS"

Claim 13, Column 38, Line 19: "second QOS value" should read "second QoS value"

Claim 14, Column 38, Line 22: "second QOS value" should read "second QoS value"

Claim 14, Column 38, Line 23: "QOS requirement" should read "QOS requirement"

Claim 15, Column 38, Line 39: "QOS value" should read "QoS value"

Claim 16, Column 38, Line 47: "second QOS value" should read "second QoS value"

Claim 16, Column 38, Line 48: "first QOS value" should read "first QoS value"

Claim 18, Column 38, Line 61: "Quality of Service (QOS) parameter" should read "Quality of Service (QoS) parameter"

Claim 18, Column 38, Line 66: "QOS requirement" should read "QoS requirement"

Claim 18, Column 39, Line 7: "first QOS value" should read "first QoS value"

Claim 18, Column 39, Line 10: "the QOS" should read "the QoS"

CERTIFICATE OF CORRECTION (continued)
U.S. Pat. No. 12,185,091 B2

Claim 20, Column 40, Line 11: "QOS value meets the QOS requirement" should read "QoS value meets the QoS requirement"

Claim 20, Column 40, Line 14: "QOS value" should read "QoS value"

Claim 20, Column 40, Line 15: "first QOS value" should read "first QoS value"